(12) United States Patent
Melen et al.

(10) Patent No.: US 8,775,886 B2
(45) Date of Patent: Jul. 8, 2014

(54) ARCHITECTURE FOR A SELF-HEALING COMPUTER SYSTEM

(75) Inventors: Roger D. Melen, Los Altos Hills, CA (US); Nader W. Moussa, Stanford, CA (US); Makoto Honda, Menlo Park, CA (US); Hideo Ikai, Tsushima (JP); Kozo Kato, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 848 days.

(21) Appl. No.: 12/415,777

(22) Filed: Mar. 31, 2009

(65) Prior Publication Data
US 2010/0281134 A1 Nov. 4, 2010

(51) Int. Cl.
*G01R 31/28* (2006.01)

(52) U.S. Cl.
USPC ............. 714/732; 709/228; 714/16; 702/185

(58) Field of Classification Search
USPC ................ 709/217; 714/16; 702/185
See application file for complete search history.

(56) References Cited

U.S. PATENT DOCUMENTS

| 6,654,910 B1* | 11/2003 | Eibach et al. | 714/37 |
| 7,472,051 B2* | 12/2008 | Mariani et al. | 703/13 |
| 2002/0077782 A1* | 6/2002 | Fruehling et al. | 702/185 |
| 2006/0070017 A1* | 3/2006 | Hayashi | 716/18 |

\* cited by examiner

*Primary Examiner* — Glenford Madamba
(74) *Attorney, Agent, or Firm* — Patent Law Works LLP

(57) ABSTRACT

The self-healing system comprises a self-healing processor and an error mitigation system. The self-healing processor includes a code block associated with the operation of a portion of digital logic. The self-healing processor also includes a dynamic signature analysis circuit. The processor executes the code block. The dynamic signature analysis circuit creates a dynamic signature representing the operation of the portion of digital logic associated with the code block. The error mitigation system receives the dynamic signature from the dynamic signature analysis circuit. The error mitigation system compares the dynamic signature to a static signature to determine if the signatures match. If the signatures do not match, then the digital logic associated with the code block has an error. The error mitigation system retries execution of the code block. The error mitigation system stores log information describing the above events.

21 Claims, 20 Drawing Sheets

OPTIMIZATION
PROCESS
(PART 2)

ARCHITECTURE FOR A SELF-HEALING COMPUTER SYSTEM

BACKGROUND OF THE INVENTION

1. Field of the Invention

The invention relates to error detection in a computer system, and more particularly, to an architecture for a computer system having self-healing functionality for detecting, mitigating and storing information about digital logic errors.

2. Background of the Invention

Modern automobiles frequently are designed to utilize numerous electronic control units ("ECUs"). Some automobiles include more than seventy ECUs. An ECU is a processor-based system that controls one or more of the electrical systems or subsystems in an automobile. For example, ECUs control fuel injection and ignition timing functions in the internal combustion engine of most automobiles. These functions are critical to automobile operation, and their failure could have potentially life-threatening repercussions for the human users of the automobile.

A current trend is to design ECUs to use processors based on smaller geometry transistors. Processors based on smaller geometry transistors offer numerous benefits for ECU design. For example, these processors tend to be cheaper than previous processors, and thus allow ECUs to be produced at lower cost. Furthermore, these processors operate at higher speeds and have lower power dissipation requirements than other, more expensive, processors.

Unfortunately, there are negative consequences associated with processors based on smaller geometry transistors. One problem is that these processors are prone to transient errors. Transient errors are short term errors in a processor's digital logic. Transient errors are frequently caused by charged alpha particles that are emitted by the sun. These particles strike processor circuitry and generate changes in the processor's substrate. As a result of this substrate change, the processor suffers short term digital logic errors.

A second problem associated with processors based on smaller geometry transistors is that these processors are prone to persistent errors. Persistent errors are long term errors in a processor's digital logic. Persistent errors are frequently caused by metal migration and/or overheating of the processor's digital circuitry.

A third problem associated with processors based on smaller geometry transistors is that the individual component parameters such as transistor transconductance and leakage vary greatly with temperature and time resulting in reduced circuit tolerances and making operating conditions more susceptible to transient and permanent logic errors.

Thus, existing methods for correcting transient and permanent logic errors have proven deficient and undesirable for implementation in ECU design. These methods require triplication of all processor circuitry. As a result, these processors are significantly more complex and expensive, and therefore impractical for implementation in ECUs.

SUMMARY OF THE INVENTION

The present invention overcomes the deficiencies of the prior art with a self-healing system capable of detecting and mitigating digital logic errors that occur in the system. The system also stores a log of information describing the detected errors, the mitigation processes implemented by the system and the results of these mitigation processes ("log information").

The self-healing system is particularly advantageous because it provides a log including detailed information about digital logic errors that occur in the system. This information is accessible by engineers who provide real-time updates to the system using a network. For example, the log information is communicated from the system to an external system using a wireless network. In one embodiment, the external system is a component of the self-healing system. The server processes this information. The server and/or engineers create update information for the system. The update information includes information for reconfiguring the system to prevent different digital logic errors from occurring in the future. The update information can be relayed back from the server to the system using a network or other communication means. The system then implements the update information, thereby preventing future processor errors from occurring.

In one embodiment, the self-healing system comprises a self-healing processor. The self-healing processor comprises a code block stored on a memory, a dynamic signature analysis circuit and an error mitigation system. The code block is associated with the operation of a portion of the processor's digital logic. In one embodiment, the code block is stored in the processor's on-chip memory. The dynamic signature analysis circuit is communicatively coupled to monitor execution of the code block. The processor executes the code block. The dynamic signature analysis circuit creates a dynamic signature representing the operation of the portion of digital logic associated with the code block.

The dynamic signature analysis circuit data is communicatively coupled to the error mitigation system. The error mitigation system receives the dynamic signature from the dynamic signature analysis circuit. The error mitigation system has a static signature representing error-free execution of the code block. The error mitigation system compares the dynamic signature to the static signature to determine if the signatures match. If the signatures do not match, then the digital logic associated with the code block has an error. The error mitigation system is communicatively coupled to the code block. The error mitigation system executes a command to retry execution of the code block if the signatures do not match. The error mitigation system creates and stores log information describing detected errors, the mitigation processes implemented to overcome the detected errors and the results of these mitigation processes.

The present invention also includes a number of methods for detecting and mitigating digital logic errors occurring in a system. These methods include creating and storing a log of information describing the detected errors, the processes implemented to mitigate these errors and the results of implementing these processes.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1A:
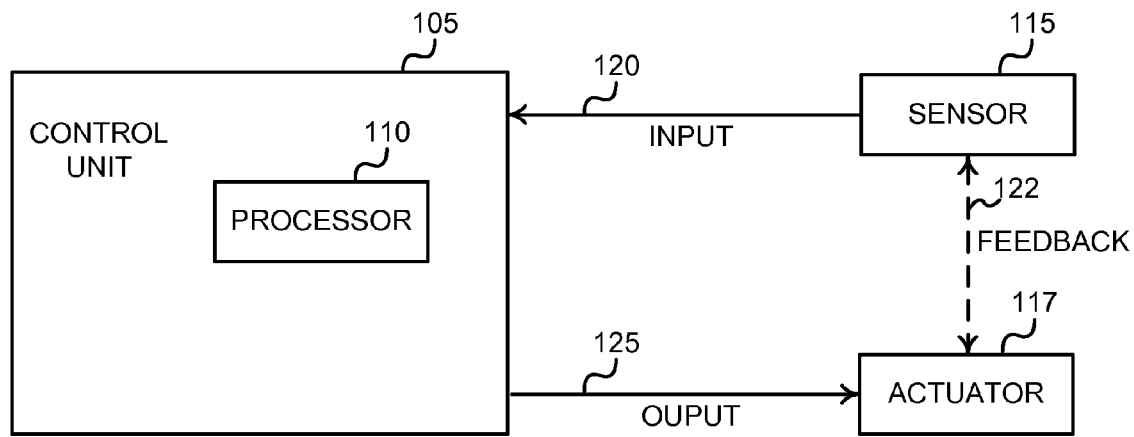
FIGS. 1A-1C are block diagrams of various embodiments of a self-healing system, including a self-healing processor, configured in accordance with the present invention.

A self-healing system 100 capable of detecting and mitigating digital logic errors occurring in the system 100 is described. The system 100 also creates and stores a log of information describing the detected errors, the mitigation processes implemented by the system and the results of these mitigation processes ("log information").

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to a control unit 105. However, the present invention applies to any type of system in which a self-healing processor 110 of the present invention is used.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. For example, the self-healing processor 110 can be implemented in a computer system including one or more storage devices and/or memories in which a computer program and/or various different log information is stored.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1A shows a first embodiment of a self-healing system 100A. This embodiment of the system 100 comprises a control unit 105 having a self-healing processor 110, a sensor 115, and an actuator 117. Signal line 120 couples the sensor 115 to the control unit 105 to send an input signal. Signal line 125 couples the control unit 105 to the actuator 117 to send an output signal. In some embodiments, a feedback signal is sent on signal line 122 between the sensor 115 and the actuator 117. While only one sensor 115, actuator 117, signal line 120, signal line 125 and signal line 122 are shown in FIG. 1 in order to simplify and clarify the description, those skilled in the art will recognize that any number of sensors 115 and/or actuators 117 may be coupled to control unit 105.

The control unit 105 is communicatively coupled to the sensor 115 via signal line 120. The control unit 105 is also communicatively coupled to the actuator 117 via signal line 125. The control unit 105 is an electronic device that controls the operation of one or more actuators 117 based on determinations made by the processor 110. For example, the control unit 105 is an Engine Control Unit ("ECU") implemented in an automobile. The control unit 105 receives input signals from the sensor 115. The input signals include information about conditions significant to the actuator 117. The control unit 150 generates output signals that are communicated to the actuator 117. The output signals control the operation of the actuator 117.

The actuator 117 is communicatively coupled to the control unit 105 and the sensor 115. The actuator 117 is a device for moving or controlling force in the self-healing system 100A. The actuator 117 comprises mechanical, electrical or a combination of electrical and mechanical components. In one embodiment, the actuator 117 is a fuel injector, spark plug, throttle regulator and/or one or more electronically-controlled valves in an automobile that are controlled by the control unit 105.

The sensor 115 is communicatively coupled to the control unit 105 via signal line 120. The sensor 115 is an electronic circuit adapted to monitor one or more actuators 117 and relay this information to the control unit 105. The information is encoded in a format that is supported by control unit 105. For example, the information is encoded as binary code. The sensor 115 gathers information about the actuator 117 and relays this information to the control unit 105 via the signal line 120. In one embodiment, the sensor 115 is communicatively coupled to the actuator 117 via a feedback line 122. In another embodiment, the sensor 115 is configured to relay information about the actuator 117 to the control unit 105 in real-time.

The processor 110 is communicatively coupled to the sensor 115 and the actuator 117. The processor 110 is an integrated circuit semiconductor chip that performs processing for the control unit 105 and controls the operation of the actuator 117. The processor 110 receives input signals from the sensor 115. In one embodiment, the processor 110 includes firmware and/or digital logic for processing the input signals. The processor 110 processes the input signals 120, and/or information contained therein, using the firmware and/or digital logic. The processor 110 generates an output signal adapted to control the operation of the actuator 117. The structure and operation of one embodiment of the processor 110 will be described in more detail below with reference to FIG. 2.

In one example, the control unit 105 is an ECU and the actuator 117 is a fuel injector in an automobile (not shown). The sensor 115 is a sensor for monitoring the amount of oxygen in the engine exhaust. For the automobile to operate safely, the amount of fuel passed to the engine (not shown) by the fuel injector should be reduced if the amount of oxygen in the exhaust is excessively high (thereby indicating a rich fuel mixture in the engine that could pose a safety risk to the human passengers in the automobile). If there is a dangerous amount of oxygen in the engine exhaust, the sensor 115 relays this information to the ECU. The ECU, e.g., the control unit 105, processes this information with the processor 110. The processor 110 generates an output signal instructing the fuel injector to decrease the amount of fuel in the engine by whatever amount is necessary to achieve a safe mixture of oxygen and fuel in the engine. Thus, in this example, the processor 110 provides a potentially life-saving function of regulating the mixture of oxygen and fuel in the engine. However, if the processor 110 experiences an error when processing the input from the sensor 115, the results could be fatal for human passengers in the automobile.

An error is a hardware error in the processor's 110 digital logic. In one embodiment, the processor 110 can experience a transient error and/or a persistent error. A transient error is a digital logic error that occurs for a short period of time. A transient errors is caused by randomly arriving charged particles that emanate from the sun (or other source) and temporarily affect the operation of the processor's 110 digital logic. A persistent error is a digital logic error that is not a transient error.

FIG. 1A depicts a one-to-one relationship between the sensor 115, the actuator 117 and the feedback signal there between. However, a person having ordinary skill in the art will understand that in practice there can be any combination of sensors 115, actuators 117 and/or feedback signals. For example, a single sensor 115 can be adapted to gather information about two or more actuators 117. Alternatively, a single actuator 117 can be monitored by two or more sensors 115. Furthermore, there can be any number of feedback signals 122 between any number of sensors 115 and any number of actuators 117.

Figure 1B:
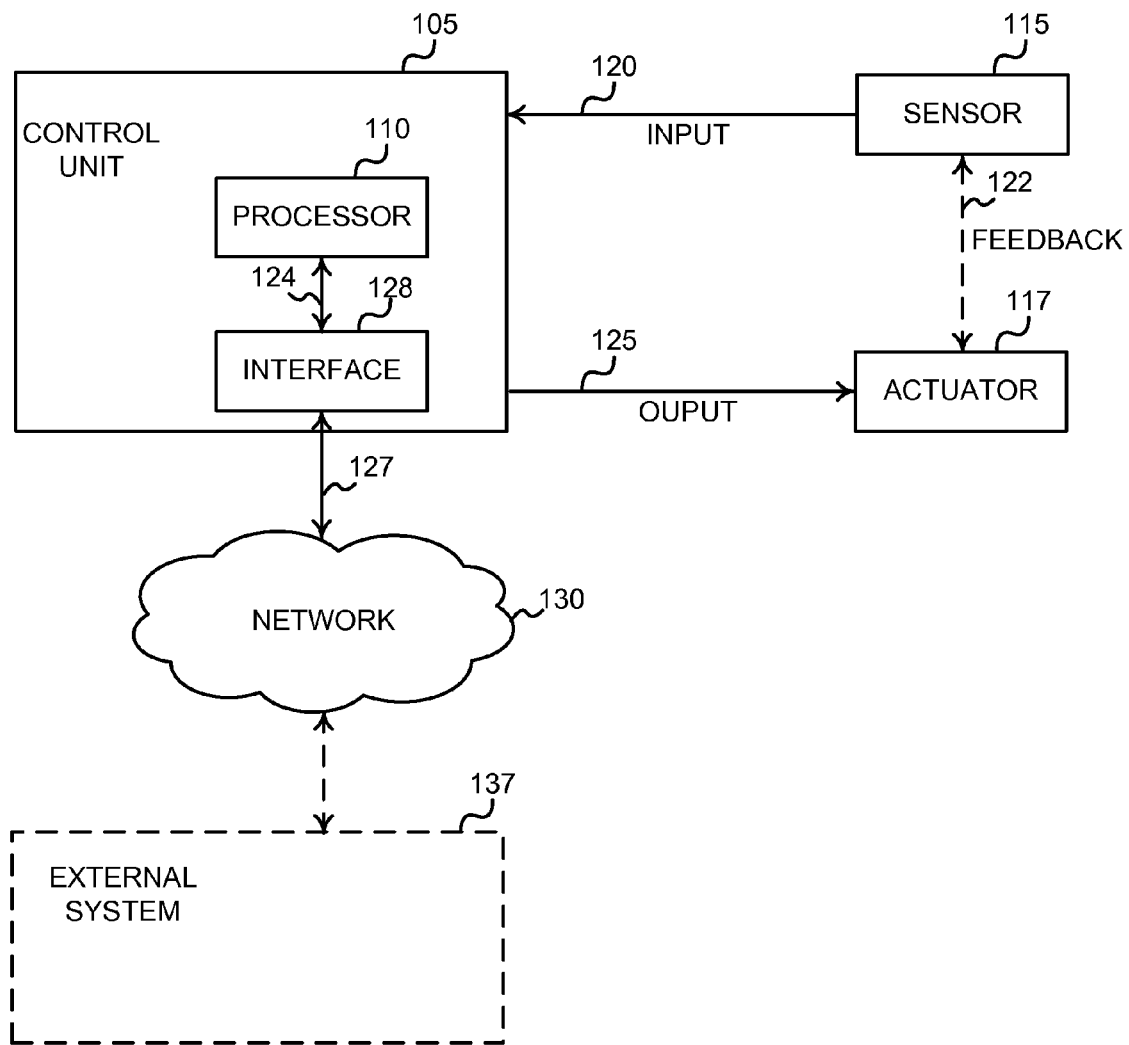
Figure 1C:
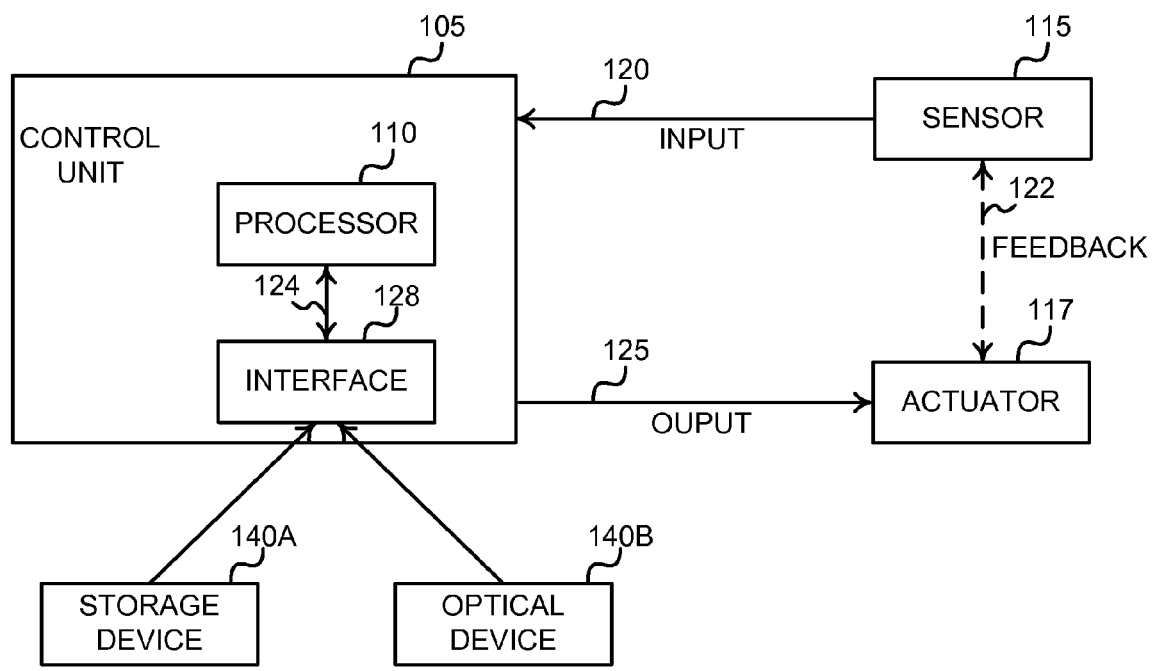

Referring now to FIGS. 1B and 1C, various additional embodiments of the self-healing system 100B, 100C are depicted. More particularly, FIGS. 1B and 1C illustrate the control unit 105 having communicative coupling to different devices. In the embodiments shown in FIGS. 1B and 1C, many of the components of the self-healing system 100B, 100C have the same or similar function to corresponding elements of the embodiment shown in FIG. 1A. Thus, like reference numbers have been used to refer to like components with the same or similar functionality. For example, like the embodiment shown in FIG. 1A, the embodiments of FIGS. 1B and 1C also include: the control unit 105; the processor 110; the sensor 115; the actuator 117; the signal line 120; the signal 125; and the signal line 122 (optional).

FIG. 1B shows a second embodiment of the self-healing system 100. This embodiment of the self-healing system 100 comprises: the control unit 105; the self-healing processor 110; the sensor 115; the actuator 117; the signal line 120; the signal line 125; the signal line 122 (optional); an interface 128; a data signal 124; a communications coupling 127; a network 130; and an external system 137.

The interface 128 is adapted for communication with a network 130 via communications coupling 127. In one embodiment, the communications coupling 127 is a wireless communications link coupling the control unit 105 to the network 130. For example, the communications coupling 127 can be a wireless communication link coupling the interface 128 to the network 130. The network 130 enables communications among the entities connected to it. In one embodiment, the network 130 is the Internet and uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

The signal line 124 couples the processor 110 to the interface 128. In one embodiment, the signal line 124 enables bidirectional flow of data between the processor 110 and the interface 128. For example, the signal line 124 and the interface 128 work together to enable information to be uploaded from the processor 110 to the network 130. The signal line 124 and the interface 128 also work together to enable information to be downloaded from the network 130 to the processor 110.

In one embodiment the control unit 105 is a computer system communicatively coupled to an external system 137 via the network 130. The external system 137 receives log information from the control unit 105. The log information describes errors that are detected by the processor 110, various different mitigation processes implemented by the processor 110 and the results of these mitigation processes. The external system 137 includes a database storing the log information from different control units 105. The external system 137 processes the log information to generate update information. The update information is information (e.g., computer code) adapted to reconfigure the control unit 105 and/or the processor 110 to prevent the occurrence and/or reoccurrence of different errors in the control unit 105 and/or the processor 110. In one embodiment, the update information (e.g., computer code) is information adapted to reconfigure the architecture of the control unit 105 and/or the processor 110 to prevent the occurrence and/or reoccurrence of different errors in the control unit 105 and/or the processor 110. The external system 137 communicates the update information to the control unit 105 via the network 130.

Although only one control unit 105 and one external system 137 are shown in FIG. 1A, in actuality there can be more than one control unit 105 and/or more than one external system 137. Thus, a particular control unit 105 can be communicatively coupled to many different external systems 137 and a particular external system 137 can be communicatively coupled to many different control units 105.

In one embodiment, the external system 137 comprises one or more servers adapted for communication with the control unit 105.

In FIG. 1C, another embodiment of the self-healing system 100C in which the interface 128 is adapted to receive information from a storage device 140A and/or an optical device 140B is shown. The storage device 140A is a non-volatile storage medium, such as a hard drive, compact disk read-only memory (CD-ROM), DVD and/or solid state memory device. The optical device 140B is any device that is adapted to communicate information via one or more beams of light (e.g., infrared communication) and/or store information received via one or more beams of light to a non-volatile memory. In one embodiment, the processor 110 uploads log information to the storage device 140A and/or the optical device 140B. In another embodiment, the storage device 140A and/or the optical device 140B store update information and the processor 110 receives the update information from the storage device 140A and/or the optical device 140B.

Self-Healing Processor 110

Figure 2:
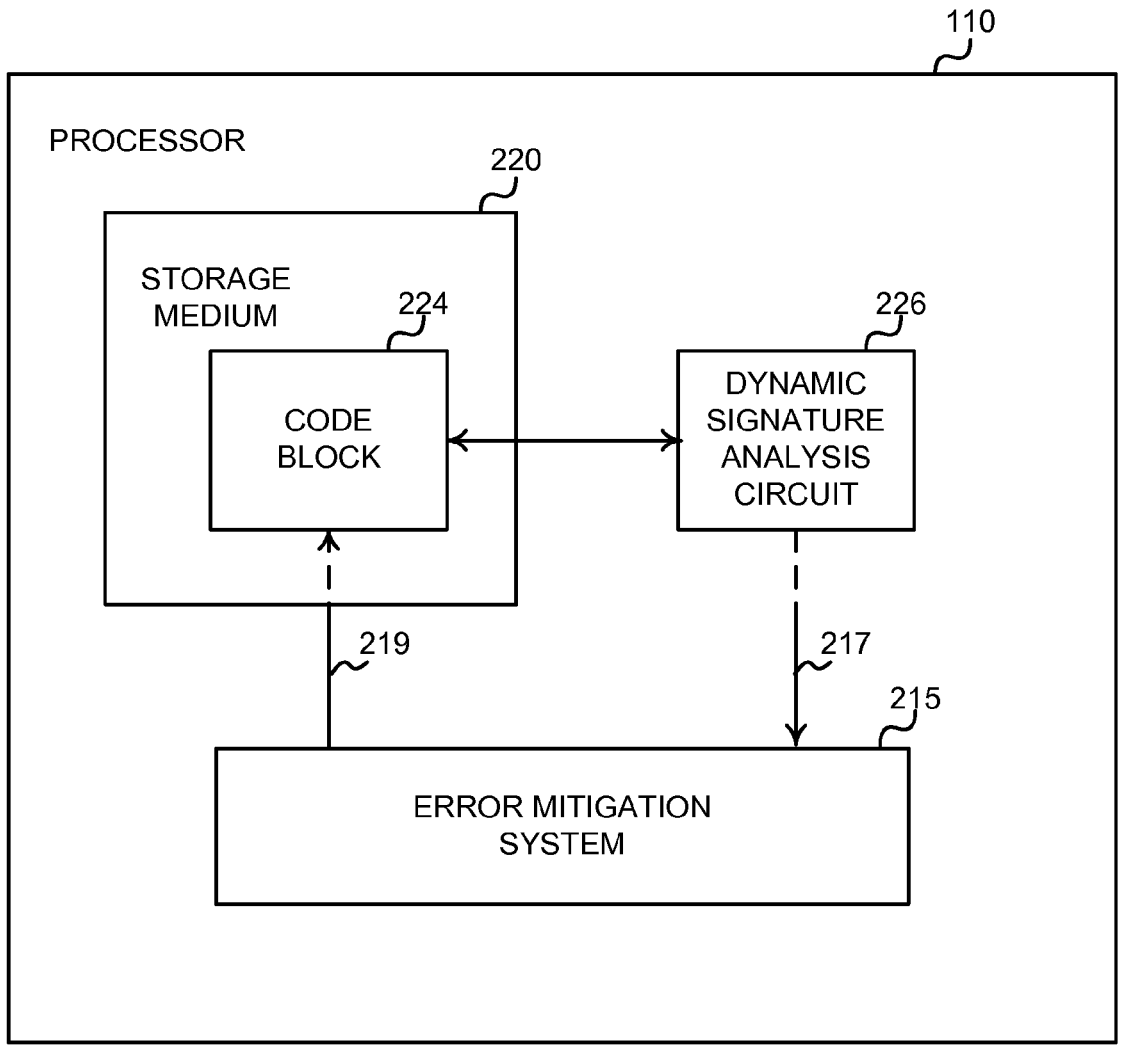
FIG. 2 is a block diagram of an embodiment of a self-healing processor configured in accordance with the present invention.

Referring now to FIG. 2, an embodiment of the self-healing processor 110 is described. In one embodiment, the self-healing processor 110 is one or more microprocessors that have been modified to include various different error mitigation components. In one embodiment, these error mitigation components are implemented as a combination of hardware and software, each of which is stored within on-chip storage included in the processor 110. The error mitigation components will now be described.

The processor 110 is divided into different functional units at compile time using a special C-language compiler. A functional unit comprises a portion of the processor's 110 digital logic. In one embodiment, the functional unit is a portion of the processor's 110 digital logic that provides a predetermined functionality for the processor 110, such as a one or more arithmetic logic units, floating point units and/or read operands decode units. The processor 110 can be divided into tens or even hundreds of functional units. The choice and number of the functional units is a design choice that varies based on the given implementation of the processor 110.

The functional unit is associated with at least one code block 224 and a dynamic signature analysis circuit 226. The code block 224 is associated with the operation a particular portion of the processor's 110 digital logic. In one embodiment, the code block 224 is associated with the operation of one or more portions of the processor's 110 digital logic. In one embodiment, the code block 224 comprises a basic block of computer-executable computer code. A basic block of computer code comprises a series of one or more procedural instructions and a branch instruction. When executed, these instructions operate on their associated digital logic to provide the functionality of the code block 224.

The code block 224 is stored in a storage unit 220. In one embodiment, the storage unit 220 is a portion of the processor's 110 on-chip non-volatile storage, such as one or more RAM or caches included in the processor 110. In one embodiment, the code block 224 is stored across one or more portions of the processor's 110 on-chip storage. In another embodiment, the code block 224 is stored external to the processor 110 on a non-volatile memory (not pictured).

The processor 110 is coupled to execute the code blocks 224. The code blocks 224 are communicatively coupled to be monitored by the dynamic signature analysis circuit 226 when executed by the processor 110. The code blocks 224 are communicatively coupled to be re-executed by an error mitigation system 215.

Although only one code block 224 is depicted in FIG. 2, in practice each functional unit can be associated with thousands or millions of code blocks 224. In order to clarify the structure described herein, code block 224 will be described in more detail with reference to FIG. 3.

The dynamic signature analysis circuit 226 is communicatively coupled to monitor execution of the code block 224. The dynamic signature analysis circuit 226 is also communicatively coupled to send input to the error mitigation system 215 via signal line 217. The dynamic signature analysis circuit 226 comprises an electronic circuit that creates dynamic signatures for the code blocks 224. A dynamic signature is a signature analysis waveform that represent the runtime operation of a particular portion of the processor's 110 digital logic. For example, each dynamic signature represents the operation of a portion of digital logic associated with a particular code block 224. The dynamic signature analysis circuit 226 creates a dynamic signature for the execution of the code block 224. The dynamic signature is created in real time or a short period of time after the execution of the code block 224. The dynamic signature analysis circuit 226 then transmits the dynamic signature to the error mitigation system 215 via signal line 217.

Although only one dynamic signature analysis circuit 226 is depicted in FIG. 2, in practice the processor 110 can have tens or even hundreds of dynamic signature analysis circuits 226. In one embodiment, each functional unit includes a dynamic signature analysis circuit 226 monitoring the execution of the different code blocks 224 associated with that functional unit.

During normal operation the processor 110 executes various different algorithms that provide the functionality described above for the control unit 105. The combination of the processor 110 and these algorithms is selected at design time so that the algorithms require less than one-hundred percent of the processor's 110 computational power during normal operation. The processor 110 uses a portion of the surplus computational power to operate the error mitigation system 215 and the dynamic signature analysis circuit 226 as background processes. These background processes include the processor 110 executing the various different code blocks 224. The error mitigation system 215 and the dynamic signature analysis circuit 226 work together to monitor the execution of code blocks 224 that operate on the processor's 110 digital logic. If execution of a code block 224 indicates that an error is present in the digital logic, then the error mitigation system 215 attempts to mitigate the error by retrying execution of the code block 224 using a hardware controller (shown for FIGS. 4A-4H). The dynamic signature analysis circuit 226 and the code block 224 are described in more detail below. The error mitigation system 215 and the hardware controller are described in more detail with reference to FIGS. 4A-4H.

Those having ordinary skill in the art will recognize that the processor 110 includes additional components that are not depicted in FIG. 2. For example, the processor 110 includes firmware, digital logic, one or more arithmetic logic units, floating point units, read operands decode units, instruction fetches, netlists and various different on-chip non-volatile storage units, including L2/L3 caches, instruction caches, data cache units, data cache units and/or register files (each of which will be collectively referred to herein as "on-chip storage" or "on-chip non-volatile storage").

The error mitigation system 215 is communicatively coupled a dynamic signature analysis circuit 226 via signal line 217. The error mitigation system 215 is also communicatively coupled to a code block 224 via signal line 219. In one embodiment, the error mitigation system 215 is software and hardware configured to execute one or more error mitigation processes for detecting and mitigating errors detected in the processor's 110 digital logic. In one embodiment, the components of the error mitigation system 215 which are software are stored in the processor's 110 on-chip storage. The error mitigation system 215 also creates and stores log information. The error mitigation system 215 receives a dynamic signature from the dynamic signature analysis circuit 226 via signal line 217. The error mitigation system 215 analyzes the dynamic signature to determine the existence of an error in the particular portion of the processor's 110 digital logic associated with the code block 224. Responsive to detecting an error, the error mitigation system 215 retries execution of the code block 224 in which the error was detected via signal line 219. Retrying the code block 224 is an attempt to achieve error-free execution of the code block 224. If the first retry attempt fails to achieve error-free execution, then the error mitigation system 215 will continue to retry execution of the faulty code block 224 a predetermined number of times (such as 1 or 10 retries). If any given retry attempt achieves an error-free execution, then the processor 110 continues on to the next code block. If error-free execution of the code block 224 is not achieved within the predetermined number of retry attempts, then the code block 224 is determined to have a persistent error.

In one embodiment, the error mitigation system 215 includes a set of stored static signatures. The static signatures are created at compile time. Each static signature is associated with a particular code block 224. The static signatures are analysis waveforms that represent the known error-free execution of the digital logic that is associated with that particular code block 224. The error mitigation system 215 compares the dynamic signature received from the dynamic signature analysis circuit 226 to the static signature for that code block 224. If the dynamic signature is different from the static signature, then error mitigation system 215 determines that the digital logic associated with that code block 224 has an error. The error mitigation system 215 then launches a retry process to correct the detected error. Several embodiments of retry processes will be described in more detail below with reference to FIG. 4A-4H.

Although the error mitigation system 215 is depicted in FIG. 2 as being coupled to only one code block 224 via one signal line 219, in practice the error mitigation system 215 can be coupled to any number of code blocks 224 via any number of signal lines 219. Similarly, although the error mitigation system 215 is depicted in FIG. 2 as being coupled to only one dynamic signature analysis circuit 226 via one signal line 217, in practice the error mitigation system 215 can be coupled to any number of dynamic signature analysis circuits 226 via any number of signal lines 217.

Code Block 224

Figure 3:
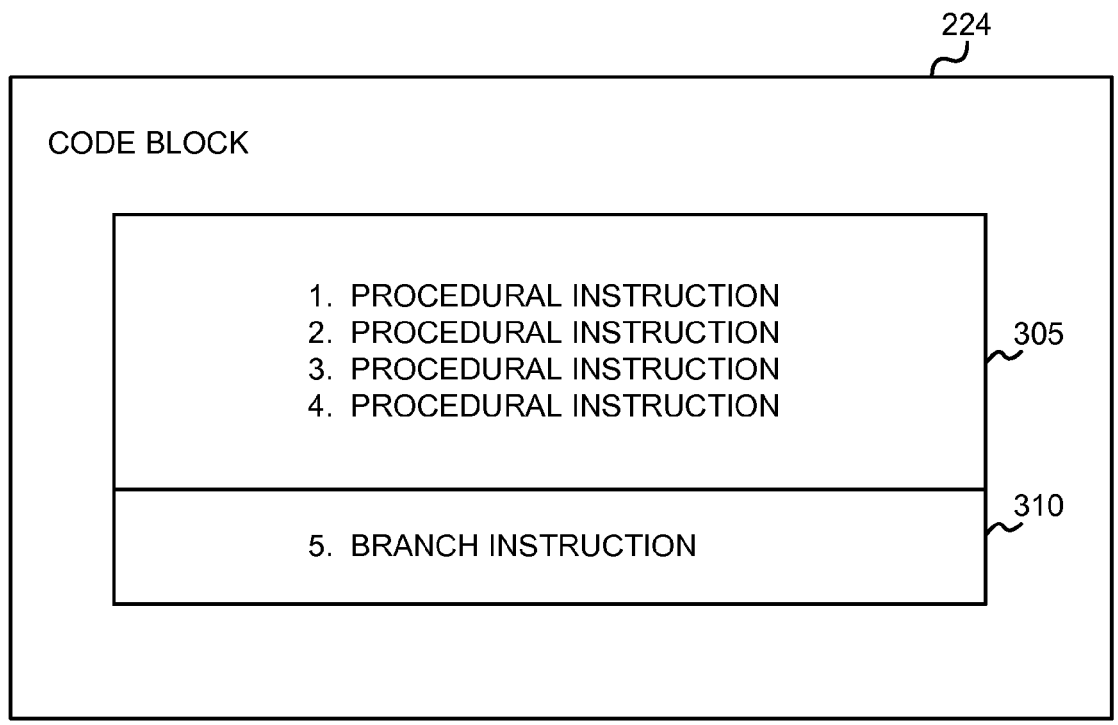
FIG. 3 is a block diagram of a code block configured in accordance with the present invention.

FIG. 3 shows an embodiment of a code block 224. Each code block 224 comprises a one or more procedural instructions 305 and a branch instruction 310. A procedural instruction 305 is computer-executable code that defines a single operation of the processor 110. Although four procedural instructions are depicted in FIG. 3, in practice hundreds or millions of procedural instructions can be included in each code block 224. In one embodiment, there is one procedural instruction included in each code block 224. A branch instruction 310 is a computer-executable code that defines a change in the flow of control in the processor 110.

Error Mitigation System 215

Figure 4A:
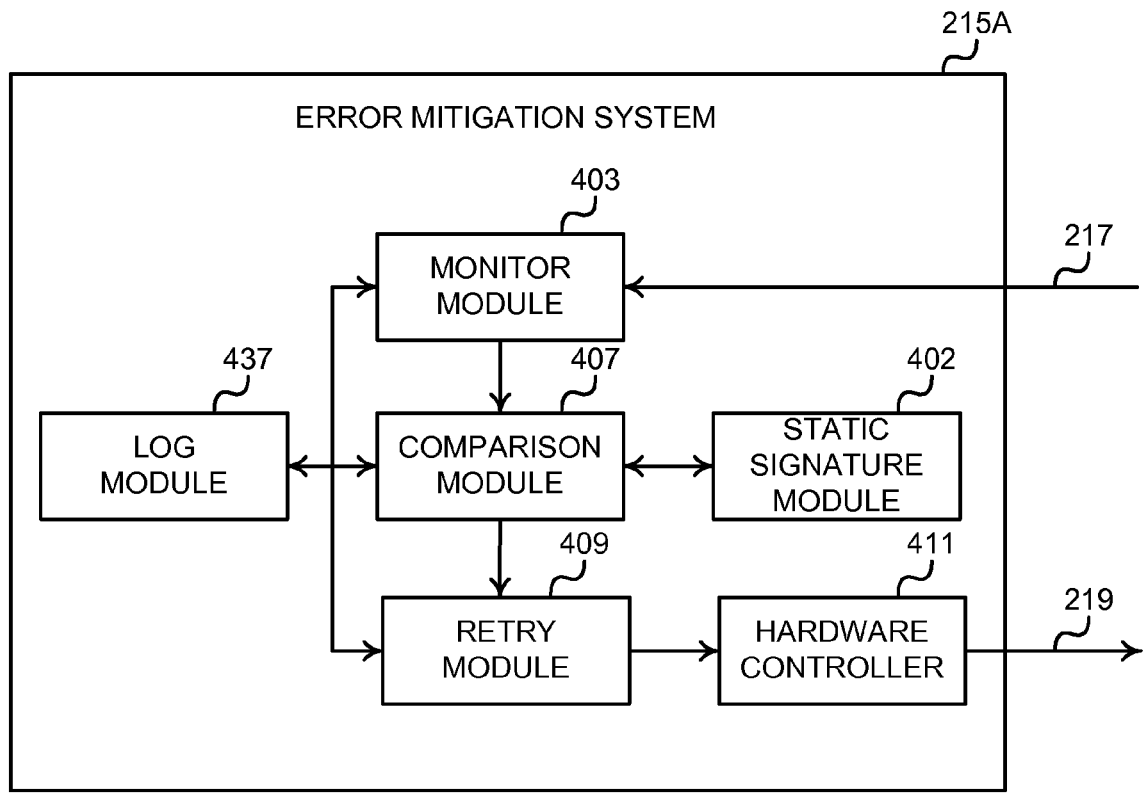
FIGS. 4A-4H are block diagrams of various embodiments of an error mitigation system configured in accordance with the present invention.

FIG. 4A shows a first embodiment of the error mitigation system 215A. In this embodiment the error mitigation system 215A is configured to execute a routine to mitigate transient errors detected in the functional units of the processor 110 by retrying execution of code blocks 224 that do not initially execute properly.

A static signature module 402 is a data structure comprised of the various different static signatures for each of the code blocks 224. In one embodiment, the static signature module 402 is stored in the processor's 110 on-chip storage. The static signature module 402 is communicatively coupled to a comparison module 407. The static signatures are created at compile time. Each static signature is associated with a particular code block 224. The static signatures each represent the known error-free execution of their associated code blocks 224. The static signature module 402 works with the comparison module 407 to determine whether dynamic signatures for the various different code blocks 224 match the static signatures for that code block. If a dynamic signature for a code block 224 matches the static signatures, then the code block 224 does not have an error. If the dynamic signatures do not match the static signatures, then the code block 224 has an error.

A log module 437 is software and routines for storing log information. The log module 437 is communicatively coupled to the various different modules of the error mitigation system 215A. In one embodiment, the log module 437 is stored in the processor's on-chip storage. In one embodiment the log information includes a description of detected errors, the code blocks 224 for which errors were detected, the number of retry attempts for errors, the different alternative configurations implemented for errors and the success or failure of these different alternative configurations. The log information also includes a description of the different decisions and determinations made by the different modules of the error mitigation system 215A. In one embodiment, the log module 437 includes software for hashing the log information. The log module 437 then stores the hashed log information. In one embodiment, the log information is stored across the processor's 110 on-chip storage. Alternatively, the log information is stored on a storage device external to the processor 110 (not pictured). For example, the control unit 105 includes RAM for storing the log information and the log module 437 is communicatively coupled to the RAM to store the log information. The log module 437 will be described in more detail below following the description of the various different modules of the error mitigation system 215A.

In one embodiment, the log module 437 includes a clock and the log information includes a description of the time when the errors are detected by the error mitigation system 215A. For example, an error is detected by the error mitigation system 215A at 4:27 PM (Eastern Standard Time) on Jul. 23, 2009 and the log module 437 records log information describing the time when the error was detected as "4:27.135498 PM Jul. 23, 2009 (Eastern Standard Time)". Thus, the log module 437 stores log information including a time code having resolution to microseconds (e.g., 4:27.135498 PM) and a date code (Jul. 23, 2009 (Eastern Standard Time)).

In one embodiment, the log module 437 includes a global positioning system (GPS) receiver and the log information includes a description of the GPS location of the system 110A, B or C at the time when the errors are detected by the error mitigation system 215A. For example, an error is detected by the error mitigation system 215A and the GPS receiver indicates that the GPS location of the system 110A is longitude 37.926868 and latitude 101.513672. Thus, the log module 437 stores log information including a description of this location.

In one embodiment, the log module 437 includes a temperature recorder and the log information includes a description of the recent hourly peak and/or average temperature of system 110A, B or C prior to the time when the errors are detected by the error mitigation system 215A. For example, an error is detected by the error mitigation system 215A and the temperature recorder indicates that the temperature data of the system 110A during the time interval prior to the error detection is (time=0 hrs, averagetemp=152 fahrenheit, peaktemp=159 fahrenheit, time=-2 hrs, averagetemp=154 fahrenheit peaktemp=160 fahrenheit, time=-24 hrs, averagetemp=148 fahrenheit peaktemp=161 fahrenheit). Thus, the log module 437 stores log information including a description of the system temperature history prior to the error detection.

A monitor module 403 is software and routines for receiving dynamic signatures from the dynamic signature analysis circuits 226. In one embodiment, the monitor module 403 is stored in the processor's 110 on-chip storage. The monitor module 403 is coupled to the dynamic signature analysis circuits 226 via coupling 217. The monitor module 403 is also communicatively coupled to the log module 437. In one embodiment the monitor module 403 repeatedly checks signal line 217 for new dynamic signatures from the signature analysis circuit 226. The monitor module 403 receives a dynamic signature from the signature analysis circuit 226. The monitor module 403 then passes the received dynamic analysis signature to the comparison module 407.

The comparison module 407 is software and routines for comparing the dynamic signatures to the stored static signatures. In one embodiment, the comparison module 407 is stored in the processor's 110 on-chip storage. The comparison module 407 is communicatively coupled to the monitor module 403 and the static signature module 402. The comparison module 407 is also communicatively coupled to the log module 437. In one embodiment, the comparison module 407 receives the dynamic signature for a particular code block 224 from the monitor module 403. The comparison module 407 retrieves the static signature for the particular code block 224 from the static signature module 402. The comparison module 407 compares the dynamic signature received from the dynamic signature analysis circuit 226 to the static signature received from the static signature module 402. The comparison module 407 then determines whether the dynamic signature matches the static signature. If the dynamic signature matches the static signature, then the processor 110 executes the next code block 224 and the process of checking for errors begins again. If the dynamic signature is different from the static signature, then comparison module 407 determines that the code block 224 has an error. The comparison module 407 then communicates the detected error to the retry module 409.

A transient error retry process will now be described. The retry module 409 is software and routines for retrying execution of code blocks 224 that have been determined to have errors. In one embodiment, the retry module 409 is stored in the processor's 110 on-chip storage. The retry module 409 is communicatively coupled to the comparison module 407 and a hardware controller 411. The retry module 409 is also communicatively coupled to the log module 437. In one embodiment the retry module 409 receives a detected error from the comparison module 407. The retry module 409 then communicates a command to the hardware controller 411 to retry execution of the code block 224. The retry module 409 is configured to retry execution of each code block 224 a predetermined number of times for each detected error. In one embodiment, the retry module 409 keeps a count of the number of retry attempts and ends the transient error retry process once the predetermined number of retries is reached.

The hardware controller 411 is a controller adapted to retry execution of various different code blocks 224 upon receiving a command from the retry module 409. The hardware controller 411 is communicatively coupled to the retry module 409. The hardware controller 411 is also communicatively coupled to the various different code blocks via coupling 219. In one embodiment the hardware controller 411 receives a command from the retry module 409 to re-execute a particular code block 224. The hardware controller 411 then retries execution of that code block 224 ("the retry execution"). The dynamic signature analysis circuit 226N creates a dynamic signature for the retry execution. This signature is passed to the monitor module 403 and the to the comparison module 407. The comparison module 407 compares the dynamic signature for the retry execution to the static signature as previous described. If the dynamic signature for the retry execution matches the static signature, then the transient error retry process for this particular code block 224 ends. If the signatures do not match, then the retry module 409 issues another command to the hardware controller 411 to execute another retry of the code block 224. This process continues until either the code block 224 executes error-free, or the retry module 409 determines that the predetermined number of retry attempts have been reached. If the predetermined number of retry attempts is reached without error free execution, then the retry module 409 determines that the processor's 110 digital logic has a persistent error. The embodiments of FIGS. 4A-4H are configured to implement the transient error retry process described above.

It is important to note that the transient error retry process is regulated by the processor 110 so that implementation of this process is performed in the background and does not affect performance in regards to the processor's 110 execution of the algorithms that provide the functionality of the control unit 105. Furthermore, in some embodiments the processor 110 will provide different amounts of processor power for implementing the different retry attempts for the transient error retry process.

The log module 437 monitors the different modules of the error mitigation system 215A and stores log information describing the code blocks 224 that experience errors. For each detected error, the log module 437 monitors the retry module 409 to determine if error-free execution of the code block 224 is achieved within the predetermined number of retries. If error-free execution is achieved, the log module 437 stores log information describing the number of retries that were required to achieve error-free execution. In one embodiment, the log module 437 also records log information describing the amount of processor power used during the various different retry attempts. This process is repeated so that the log module 437 stores log information that describes the code blocks 224 that experience errors and the outcome of these errors. The log module 437 will be described in more detail with reference to FIGS. 4B-4H.

Referring now to FIGS. 4B-4H, various additional embodiments of the error mitigation system 215 are depicted. More particularly, FIGS. 4B-4H illustrate various different components of the error mitigation system 215 that can be utilized for mitigating persistent errors in the processor's 110 digital logic. In the embodiments shown in FIGS. 4B-4H, many of the components of the error mitigation system 215 have the same or similar function to corresponding elements of the embodiment shown in FIG. 4A. Thus, like reference numbers have been used to refer to like components with the same or similar functionality. For example, like the embodiment shown in FIG. 4A, the embodiments of FIGS. 4B-4H also include: the static signature module 402; the monitor module 403; the comparison module 407; the retry module 409; the hardware controller 411; and the log module 437.

Figure 4B:
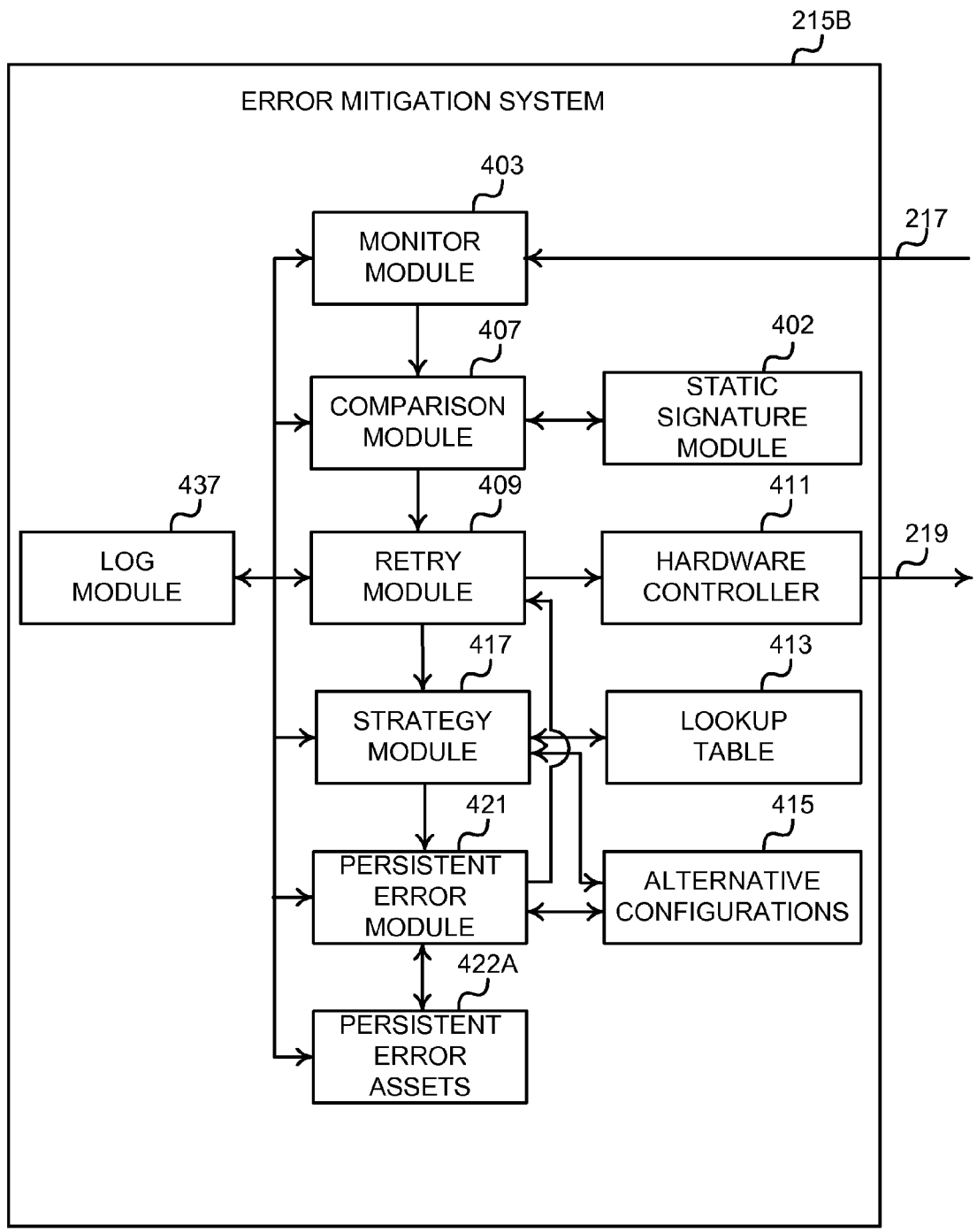

FIG. 4B shows a second embodiment of the error mitigation system 215B. In this embodiment the error mitigation system 215B comprises: the static signature module 402; the monitor module 403; the comparison module 407; the retry module 409; the hardware controller 411; a lookup table 413; a set of alternative configurations 415; a strategy module 417; a persistent error module 421; a set of persistent error assets 422A; and the log module 437.

The set of alternative configurations 415 is a set of various different alternative machine configurations for the processor's 110 digital logic. The alternative configurations 415 rely on different subgroups of the processor's 110 digital logic that are different from the processor's 110 native hardware configuration. In one embodiment the alternative configurations 415 are created at compile time. For example, the processor 110 is analyzed at compile time using a modified C compiler. The modified compiler generates a component list describing which of the processor's 110 components are used during the execution of each code block 224. The component list is then processed using algorithms to determine various different alternative configurations that allow the processor 110 to continue to function with one or more persistent errors. Thus, it is important to note that although some of the alternative configurations may allow the processor 110 to operate perfectly, it is not necessarily required that the alternative configurations create a perfectly running processor 110. Rather, all that is required is that the alternative configurations enable the processor 110 to continue to function even though the processor's 110 digital logic contains one or more persistent errors. The alternative configurations are stored in the processor's 110 on-chip storage as the set of alternative configurations 415. There are a limited number of alternative configurations 415 for each code block 224.

The lookup table 413 is a data structure including a sequence list that describes the order in which the various different alternative configurations 415 should be attempted. In one embodiment, the lookup table 413 is stored in the processor's 110 on-chip storage. In one embodiment, the lookup table 413 includes a "best candidates list" for each code block 224 that describes the limited number of alternative configurations 415 for each code block 224. The alternative configurations 415 for each code block 224 are ranked in the list based on the likelihood that they will achieve error-free execution of the code block 224. The lookup table 413 beneficially enables the processor 110 to find an error-free alternative configuration 415 with the greatest amount of execution speed while also utilizing as much of the processor's 110 error free hardware as possible.

In one embodiment, the lookup table 413 is created at compile time based on the component list that was used to create the alternative configurations 415. For example, the processor 110 is analyzed at compile time using a modified C compiler to create a component list, and the component list is processed with an optimization algorithm to create the lookup table 413. The lookup table 413 is optimized using various different data. For example, the lookup table 413 is optimized using: historical information of processor 110 component failure; engineering estimates of processor 110 module failure rates based on engineering data; and incorporation of modifications to the lookup rankings based on component utilization data that is automatically generated by development software.

The persistent error retry process will now be described. The persistent error retry sequence is similar to the transient error retry sequence described above for FIG. 4A, with several differences.

The strategy module 417 is also communicatively coupled to the retry module 409, the persistent error module 421 and the log module 437. The lookup table 413 and the alternative configurations 415 are also communicatively coupled to the strategy module 417. The strategy module 417 is software and routines for determining which alternative configurations 415 to implement given a persistent error for a particular code block 224. In one embodiment, the strategy module 417 is stored in the processor's 110 on-chip storage. In one embodiment, the strategy module 417 receives information from the retry module 409 indicating that a particular code block 224 has a persistent error. This information is received from the retry module 409 responsive to the retry module 409 executing a predetermined number of retry executions of the code block 224 without having achieved error-free execution. The strategy module 417 communicates with the lookup table 413 to receive information identifying a first alternative configuration 415 to try for the code block 224 having the persistent error (i.e., the highest ranked alternative configuration 415 for the particular code block 224). The strategy module 417 receives the information identifying the highest ranked alternative configuration from the lookup table 413. The strategy module 417 then communicates with the set of alternative configurations 415 to retrieve information describing the highest ranked alternative configuration identified by the look-up table 413. The strategy module 421 then communicates this information to the persistent error module 421.

Figure 4C:
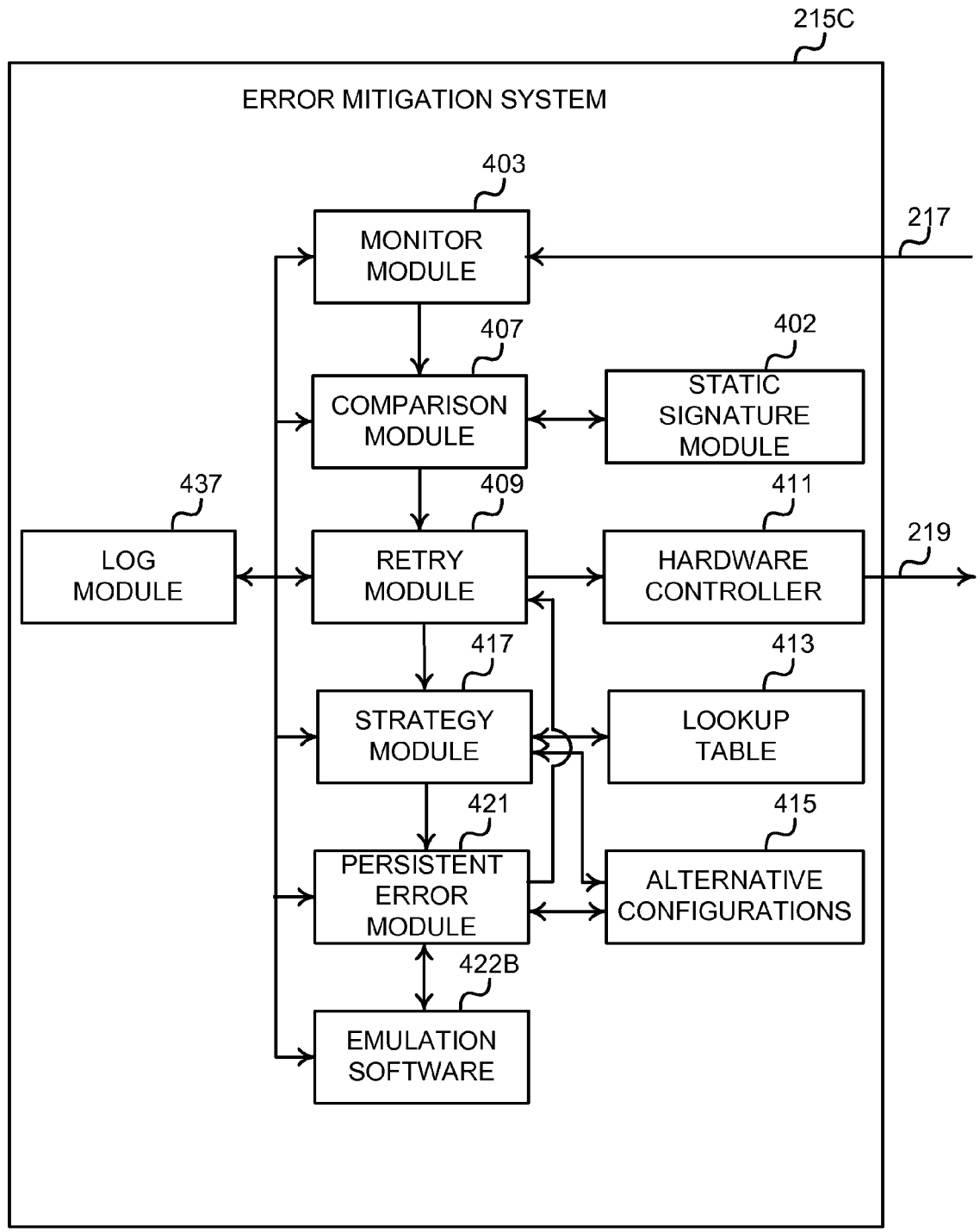
Figure 4D:
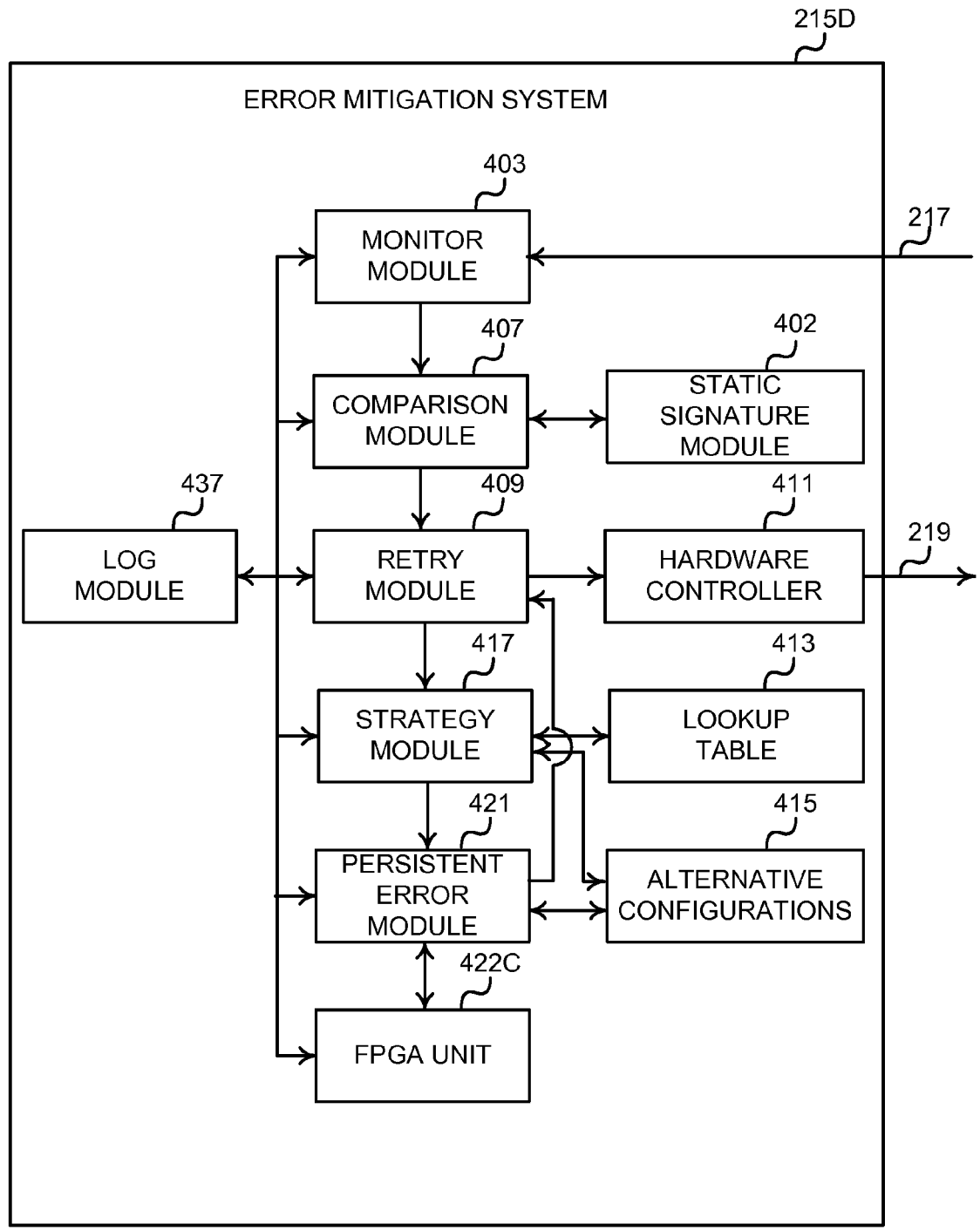
Figure 4E:
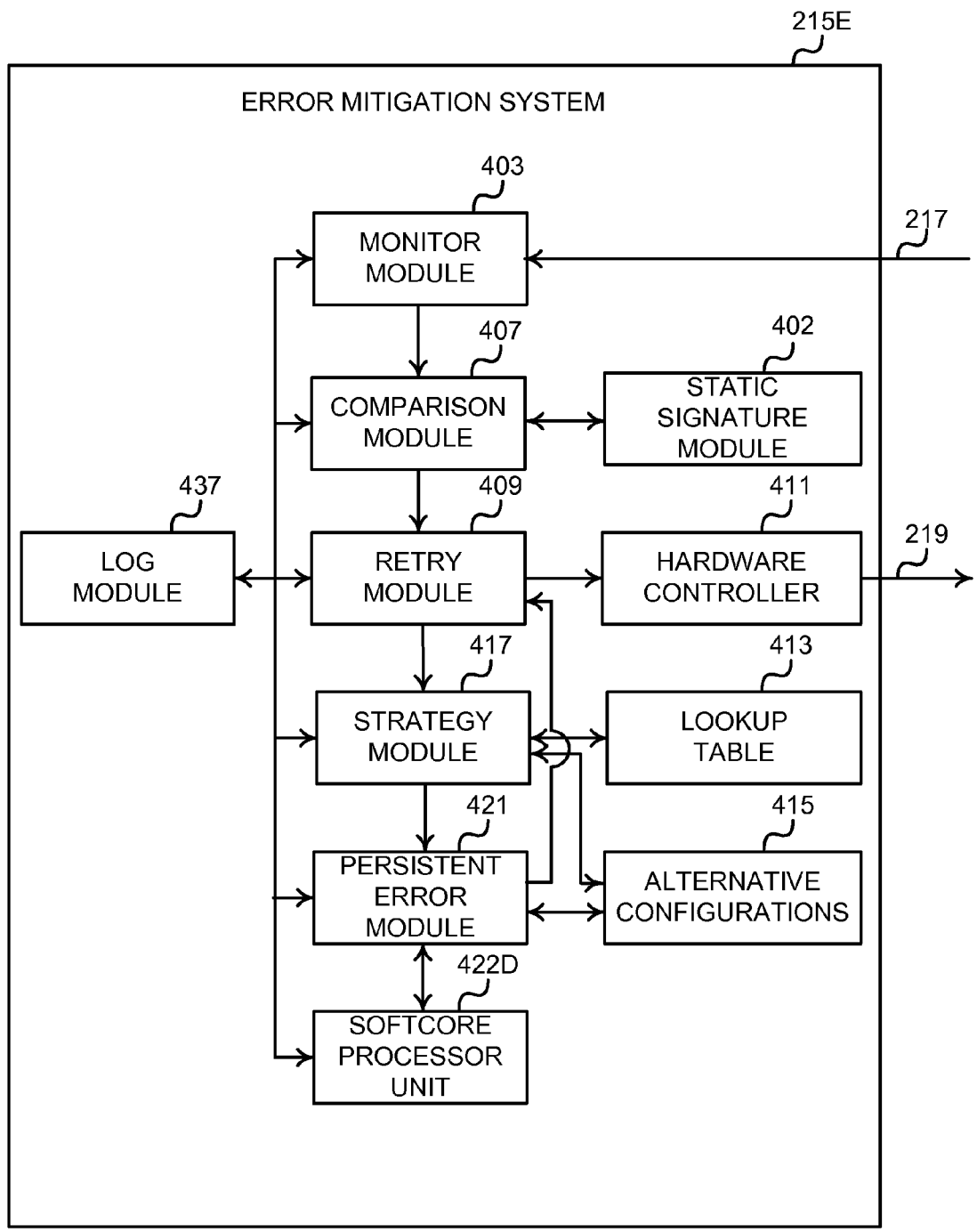

The persistent error assets 422A are different software and/or hardware components that are utilized by the persistent error module 421 to implement the alternative configurations 415. In one embodiment, the persistent error assets 422A are stored in the processor's 110 on-chip storage. In another embodiment, the persistent error assets 422A are stored across one or more non-volatile memories external to the processor 110 (not pictured). The persistent error assets 422A are communicatively coupled to the persistent error module 421. FIGS. 4C-4E each show different kinds of software and/or hardware that can be included in the persistent error assets 422A. Thus, the persistent error assets will be described in more detail with reference to FIGS. 4C-4E.

The persistent error module 421 is software and routines for working with persistent error assets 422A to implement the alternative configurations 415. In one embodiment, the persistent error module 421 is stored in the processor's 110 on-chip storage. The persistent error module 421 is communicatively coupled to the strategy module 417, the set of alternative configurations 415, the persistent error assets 422A and the log module 437. In one embodiment the persistent error module 421 receives information describing the highest ranked alternative configuration 415 from the strategy module 417. The persistent error module 421 then configures the persistent error assets 422A to implement the highest ranked alternative configuration 415. The persistent error module 421 then communicates with the retry module 409 to indicate that it is time to retry the code block 224.

In one embodiment the hardware controller 411 receives a command from the retry module 409 to re-execute a particular code block 224. The hardware controller 411 then retries execution of that code block 224 ("the persistent error retry execution"). The dynamic signature analysis circuit 226 creates a dynamic signature for the persistent error retry execution. This signature is passed to the monitor module 403 and the to the comparison module 407. The comparison module 407 compares the dynamic signature to the static signature. If the dynamic signature matches the static signature, then the persistent error retry process ends. If the signatures do not match, then the retry module 409 communicates the failed retry to the strategy module 417. The strategy module 417 then begins the process of implementing a second alternative configuration. In other words, the error mitigation system 215 implements the second highest ranked alternative configuration 415 and then executes another retry of the code block 224. The process for implementing a second alternative configuration is the same as for implementing the first alternative configuration. The error mitigation system 215 will continue to implement alternative configurations 415 and execute retries of the code block 224 until either all of the alternative configurations 415 for the code block 224 are tried, or an alternative configuration 415 is found that allows the processor 110 to operate with the persistent error, i.e., until the code block 224 executes error-free.

The embodiments of FIGS. 4B-4H are each configured to implement the persistent error retry process. Furthermore, like the transient error retry process, the persistent error retry process is regulated by the processor 110 so that implementation of the retry sequence does not affect performance in regards to the processor's execution of the algorithms that provide the functionality of the control unit 105. Also similar to the transient retry process, in some embodiments the processor 110 will provide different amounts of processor power for implementing the different retry attempts.

During the persistent error retry process, the log module 437 creates a log of the same log information described above for FIG. 4A. In addition to this log information, the log module 437 also stores additional log information. In one embodiment, the log module 437 monitors the strategy module 417 and the comparison module 407 to determine which alternative configurations are tried and which, if any, of these configurations achieves an error-free execution of the code block 224. If error-free execution is not achieved using any of the available alternative configurations 415 for the code block, then the log module 437 stores log information describing the different alternative configurations 415 that were tried and the failure of these configurations to achieve error-free execution of the code block 224. If error-free execution is achieved, then the log module 437 stores log information describing the successful alternative configuration 415. This log information is then associated with the earlier log information describing the code block 224. This process is repeated so that the log module 437 stores log information that describes the code blocks 224 that experience errors, the alternative configurations implemented for these errors and the outcome of these errors.

Referring now to FIGS. 4C-4E, each of these Figures show different kinds of software/hardware that can be included in the persistent error mitigation assets 422A. Thus, the purpose of FIGS. 4C-4E is to describe this hardware/software and how each is utilized by the persistent error module 421 to implement the various different alternative configurations 415.

FIG. 4C shows a third embodiment of the error mitigation system 215C. In this embodiment the error mitigation system 215C comprises: the static signature module 402; the monitor module 403; the comparison module 407; the retry module 409; the hardware controller 411; the lookup table 413; the set of alternative configurations 415; the strategy module 417; the persistent error module 421; the log module 437; and a set of emulation software 422B. Thus, in this embodiment, the persistent error mitigation assets 422A are a set of emulation software 422B.

Emulation software 422B is software that is configured to duplicate the functions of digital logic. In one embodiment, the persistent error module 421 communicates with the emulation software 422B. The persistent error module 421 then configures the emulation software 422B to duplicate the functionality described by the highest ranked alternative configuration 415 for the given retry attempt. The persistent error module 421 then executes the emulation software 422B. The persistent error module 421 then proceeds as described above for the persistent error retry process.

FIG. 4D shows a fourth embodiment of the error mitigation system 215D. In this embodiment the error mitigation system 215D comprises: the static signature module 402; the monitor module 403; the comparison module 407; the retry module 409; the hardware controller 411; the lookup table 413; the set of alternative configurations 415; the strategy module 417; the persistent error module 421; the log module 437; and a set stored Field-Programmable Gate Arrays ("FPGA") units 422C. Thus, in this embodiment, the persistent error mitigation assets 422A are a set of FPGA units 422C.

The FPGA units 422C are the result of a methodology based on reconfiguring digital logic to achieve a certain functionality. For example, FPGA are semiconductor devices that can be reconfigured to achieve the functionality of a given digital logic architecture or sub-architecture. In one embodiment the persistent error module 421 communicates with the stored FPGA units 422C. The persistent error module 421 then configures the FPGA units 422C to duplicate the functionality described by the alternative configurations 415. The persistent error module 421 then implements the configured FPGA 422C unit in the digital logic of the processor 110. The persistent error module 421 then proceeds as described above for the persistent error retry process.

FIG. 4E shows a fifth embodiment of the error mitigation system 215E. In this embodiment the error mitigation system 215E comprises: the static signature module 402; the monitor module 403; the comparison module 407; the retry module 409; the hardware controller 411; the lookup table 413; the set of alternative configurations 415; the strategy module 417;

the persistent error module 421; the log module 437; and a set of soft-core processors units 422D. Thus, in this embodiment, the persistent error mitigation assets 422A are a set of soft-core processor units 422D.

Soft-core processor units 422D are the result of a methodology based on reconfiguring the digital logic separating different architectural locations on a processor 110. For example, the processor 110 includes a netlist. A netlist is a data structure that describes the interconnection of digital logic between the processor's 110 various different architectural locations. Assume the netlist includes a description of the various different digital logic that interconnect point "A" to point "B." Further assume that the digital logic interconnecting point "A" to point "B" is not equivalent to any of the stored alternative configurations 415. Thus, in one embodiment the persistent error module 421 implements a particular alternative configuration 415 by modifying the netlist so that the digital logic interconnecting point "A" to point "B" is equivalent to a particular alternative configuration 415. The persistent error module 421 then proceeds as described above for the persistent error retry process.

A person having ordinary skill in the art will recognize that this process can be repeated for different architectural locations and different alternative locations. The person having ordinary skill in the art will also recognize that the above example based on netlists is a species description of the broader genus idea of soft-core processors. Thus, it is to be understood that the embodiment of FIG. 4E is not limited to implementations utilizing netlists or their equivalent.

The soft-core processor units 422D can be configured at various different times. For example, the soft-core processor units 422D are configured in real time after an error is detected by the error mitigation system 215, at boot time when the processor 110 is initially powered on and/or at manufacture time when the processor 110 is initially manufactured.

Figure 4F:
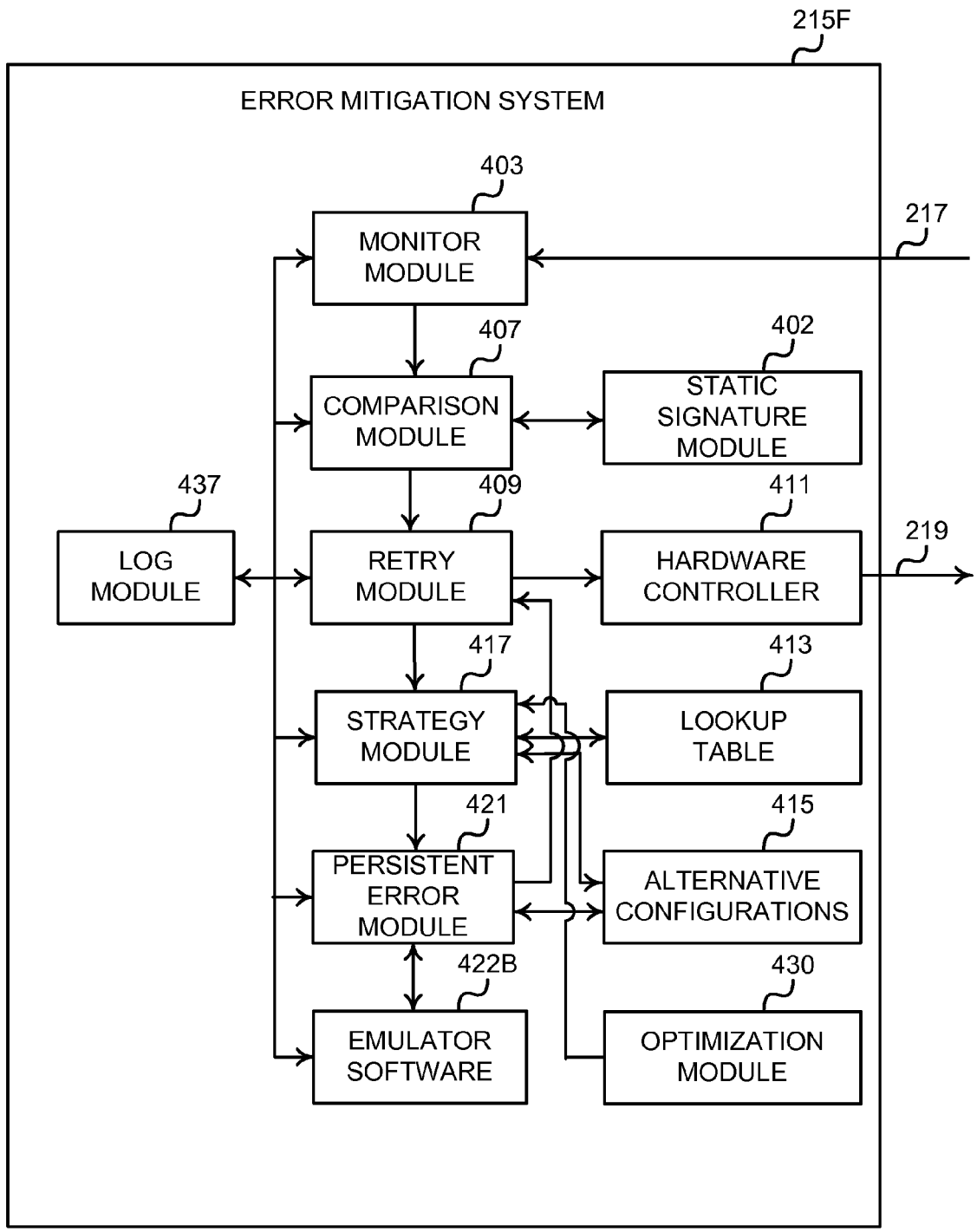

FIG. 4F shows a sixth embodiment of the error mitigation system 215F. In this embodiment the error mitigation system 215F comprises: the static signature module 402; the monitor module 403; the comparison module 407; the retry module 409; the hardware controller 411; the lookup table 413; the set of alternative configurations 415; the strategy module 417; the persistent error module 421; the log module 437; the set of emulation software 422B; and an optimization module 430.

An optimization process will now be described. The optimization module 430 is software and routines for executing additional runs of the persistent error retry sequence using the emulator software 422B described above for FIG. 4C. In one embodiment, the optimization module 430 is stored in the processor's 110 on-chip storage. The optimization module 430 is communicatively coupled to the strategy module 417. Specifically, the optimization module 430 communicates with the strategy module 417 after the persistent error retry process described above has successfully implemented an alternative configuration 415 that achieves error-free execution of a code block 224. The optimization module 430 causes the strategy module 417 to use surplus computational power to continue emulating each of the remaining alternative configurations 415 included in the best candidate list for the particular code blocks 224. If this process shows that a different alternative configuration 415 would provide a configuration that utilizes more of the processor's 110 error-free hardware, then the error mitigation system 215 will substitute this different alternative configuration 415 for the first successful alterative configuration 415.

The log module 437 monitors the above described optimization process. The log module 437 records log information describing the various different alternative configurations 415 implemented by the optimization module 430, and the results of implementing these alternative configurations 415.

Figure 4G:
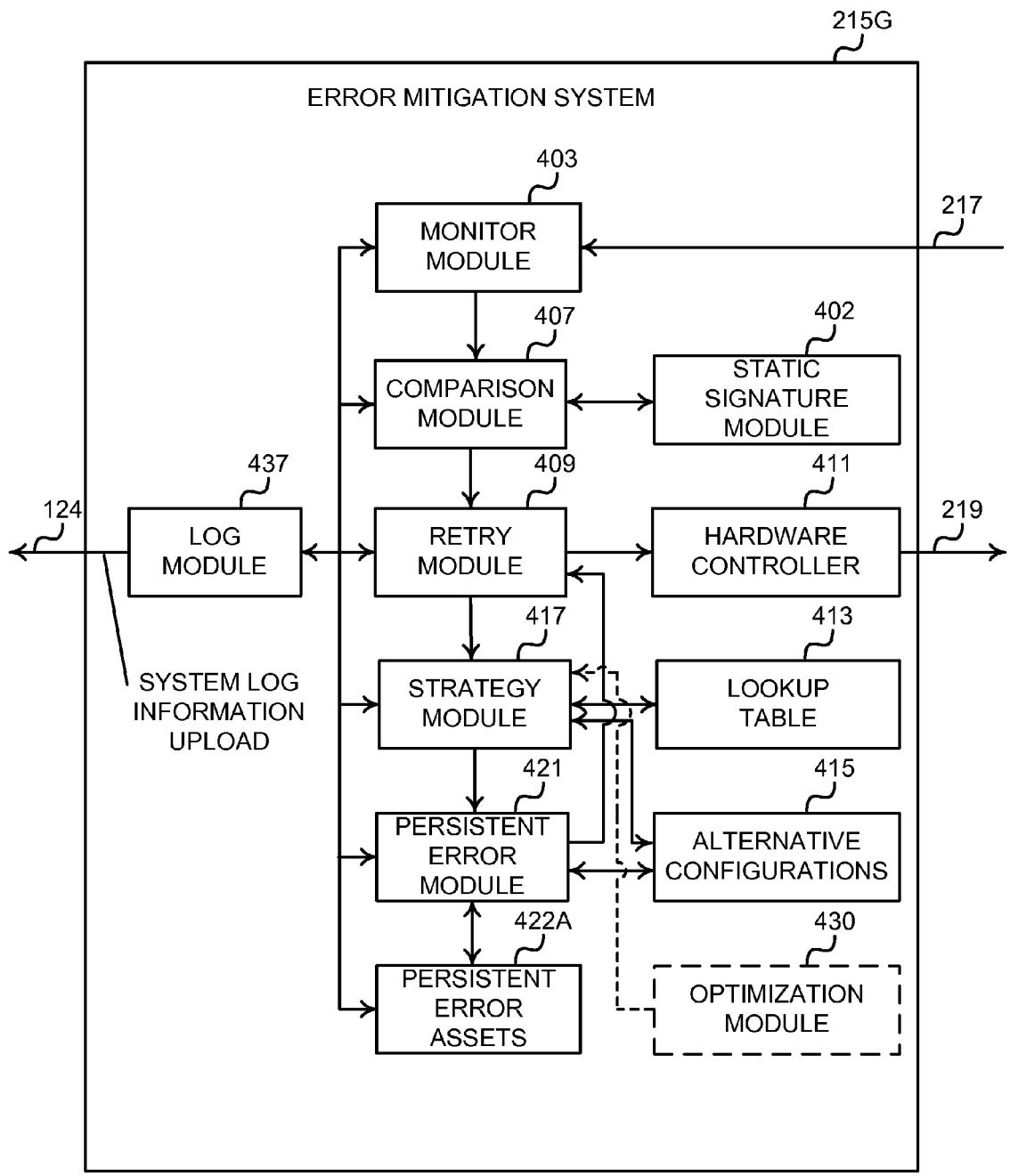

FIG. 4G shows a seventh embodiment of the error mitigation system 215G. In this embodiment the error mitigation system 215G comprises: the static signature module 402; the monitor module 403; the comparison module 407; the retry module 409; hardware controller 411; the lookup table 413; the set of alternative configurations 415; strategy module 417; the persistent error module 421; the log module 437; the set of persistent error assets 422A; and the optimization module 430 (optional).

In this embodiment, the error mitigation system 215 is communicatively coupled to the signal line 124 and the log module 437 is configured to upload the log information to an external system 137. In one embodiment, the error mitigation system 215 uploads the log information to the external system 137 via the interface 128 and the network 130 shown in FIG. 1B. For example, the log module 437 can format the log information as an XML file and then upload this information to the external system 137 at predetermined intervals.

A person having ordinary skill in the art will understand how log information can be delivered to an external system using a storage device 140A or optical device 140B as depicted in FIG. 1C.

Figure 4H:
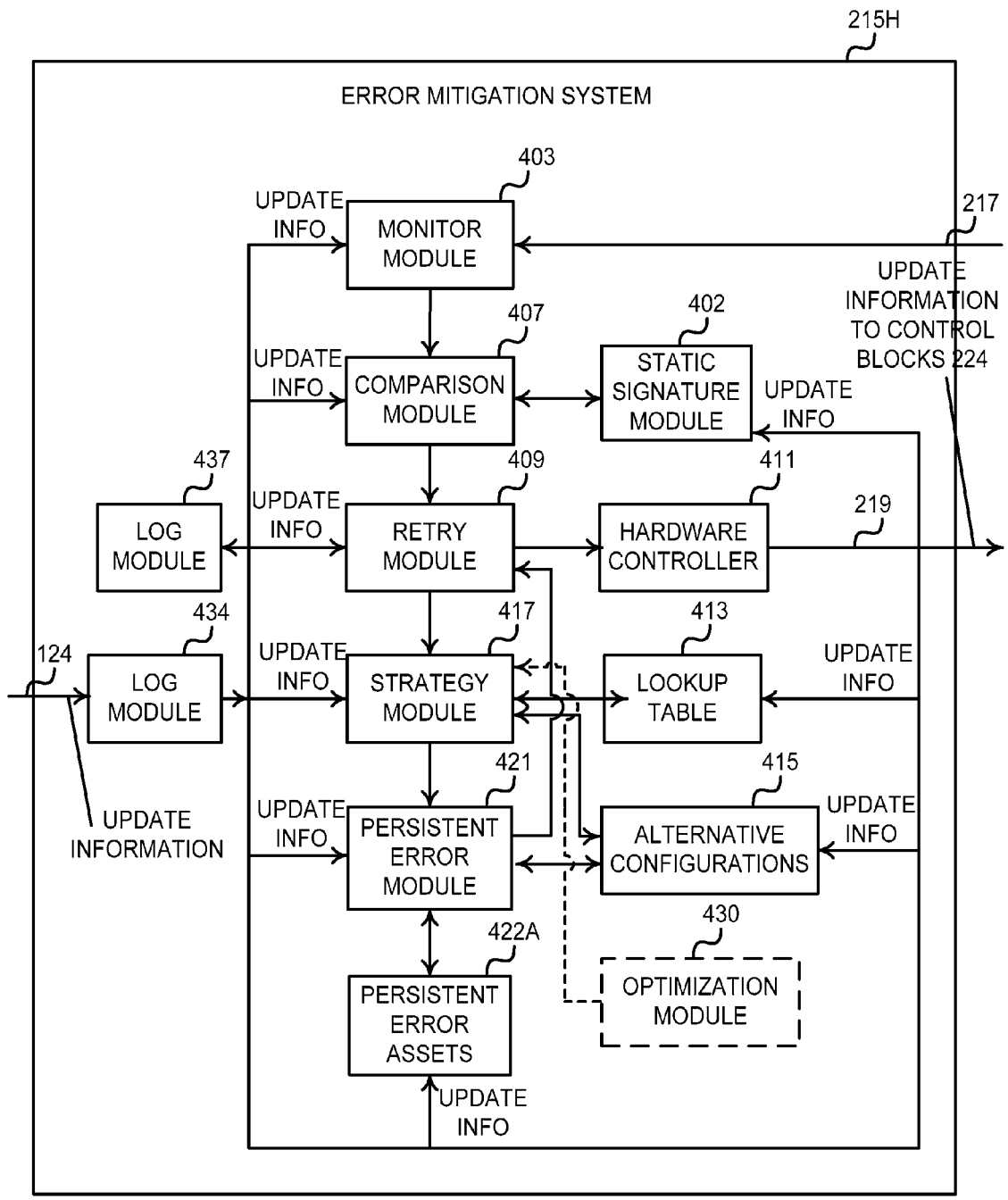

FIG. 4H shows an eighth embodiment of the error mitigation system 215H. In this embodiment the error mitigation system 215H comprises: the static signature module 402; the monitor module 403; the comparison module 407; the retry module 409; the hardware controller 411; the lookup table 413; the set of alternative configurations 415; the strategy module 417; the persistent error module 421; the log module 437; the set of persistent error assets 422A; the optimization module 430 (optional); and an update module 434.

In this embodiment, the error mitigation system 215H is communicatively coupled to the signal line 124 and the update module 434 is configured to receive update information. In one embodiment, the error mitigation system 215 receives update information from the external system 137 via the interface 128 and the network 130 shown in FIG. 1B.

The update module 434 is software and routines configured to receive update information via the data signal 124. In one embodiment, the update module 434 is stored in the processor's 110 on-chip storage. The update module 434 is communicatively coupled to the various different modules of the error mitigation system 215. The update module 434 is also communicatively coupled to the persistent error assets 422A, the set of alternative configurations 415, the lookup table 413 and the different code blocks 224 (via coupling 219). In one embodiment, the external system 137 has received log information from different control units 105 describing different code blocks 224 that have experienced errors and the outcomes for these errors. The external system 137 aggregates, creates a set of update information based on the log information. The external system 137 stores the set of update information on a database. The update information is adapted to reconfigure the error mitigation system 215H.

One goal of the update information is to achieve a digital logic configuration for the processor 110 that will experience less errors. Another goal of this reconfiguration is to achieve a digital logic configuration for the processor 110 that will not repeat historical errors experienced by the different control units 105. For example, the update information can provide a firmware update and/or a netlist update for the error mitigation system 215. A firmware update is information that changes the processor's 110 firmware. For example, a firmware update can reconfigure, among other things, any combination of the various modules included in the error mitigation system 215 and/or the various different code blocks 224 that are executed by the processor 110. In one embodiment a firmware update reconfigures the lookup table 413 to include different rankings. A netlist update is information that changes the processor's 110 netlist (not pictured) to specify different interconnections between the processor's 110 various different architectural locations. Thus, a netlist update can effectively reconfigure the processor's 110 digital logic.

A person having ordinary skill in the art will understand how update information can be delivered to the error mitigation system 215 using a storage device 140A or optical device 140B as depicted in FIG. 1C.

In one embodiment the update module 434 receives the update information via the data signal 124. The update module 434 analyzes the update information to determine the type of update included in the information (i.e., a firmware update and/or a netlist update). The update module 434 then communicates with the different components of the processor 110 to implement the update. For example, if the update information includes a firmware update, then the update module 434 reconfigures the processor's firmware based on the firmware update.

Methods

Figure 5:
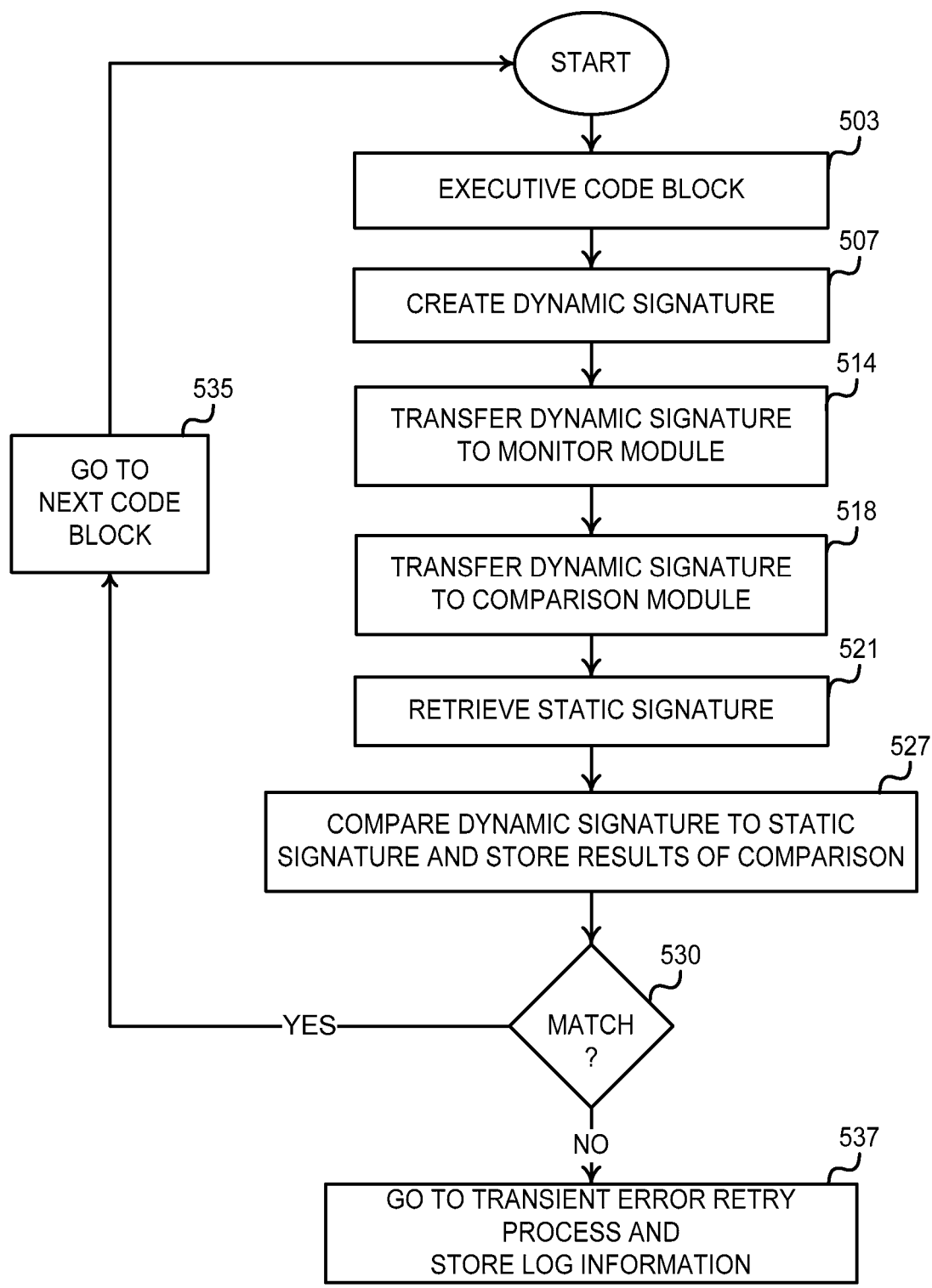
FIG. 5 is a flow chart of a method for determining whether a code block has an error in accordance with the present invention.

FIG. 5 is a flowchart of a general method for one embodiment for the self-healing processor 110 to monitor for errors within the processor's 110 digital logic. The method begins with the processor 110 executing 503 a code block 224. The dynamic signature analysis circuit 226 creates 507 a dynamic signature for the execution of the code block 224. The dynamic signature analysis circuit 226 transfers 514 the dynamic signature to the monitor module 403. The monitor module 403 receives the dynamic signature from the dynamic signature circuit 226 via coupling 217. The monitor module 403 transfers 518 the dynamic signature to the comparison module 407. The comparison module 407 receives the dynamic signature from the monitor module 403. The comparison module 407 accesses the static signature module 402 and retrieves 527 the static signature for the code block 224. The comparison module 407 compares 527 the dynamic signature to the static signature to determine if the signatures match 530. If the signatures match 530, then the error mitigation system 215 goes 535 to the next code block 224 to check for errors. If the signatures do not match 530, then the error mitigation system 215 begins the transient error retry process 537. The log module 437 stores log information describing the above events.

Figure 6:
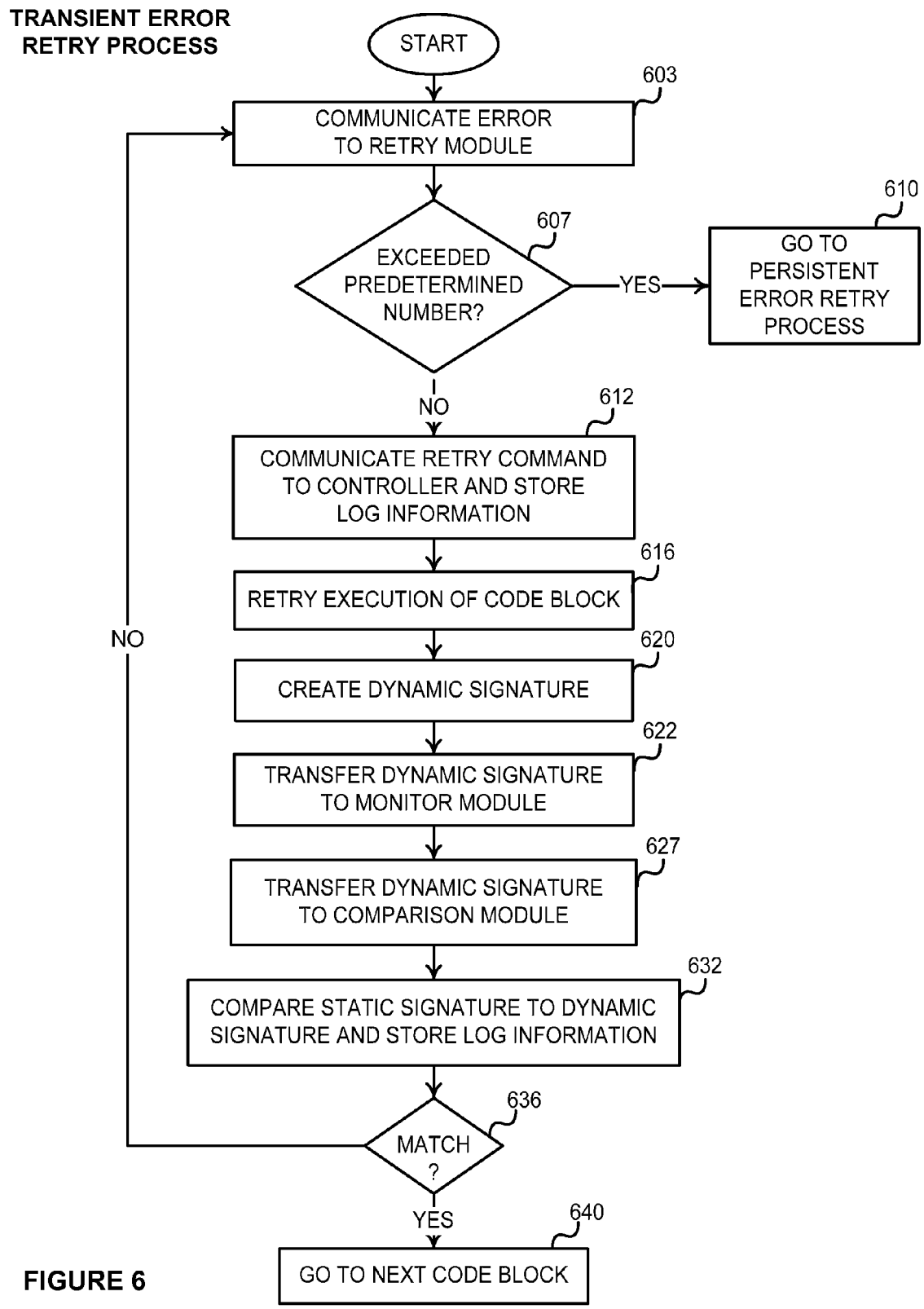
FIG. 6 is a flow chart of a method for mitigating transient errors detected in digital logic in accordance with the present invention.

Referring now to FIG. 6, a flowchart of a general method for one embodiment of the transient error retry process is described. The process begins when the comparison module 407 communicates 603 a detected error to the retry module 409. The retry module 409 receives information describing the detected error from the comparison module 407. The retry module 409 checks 607 an internal count to determine if a predetermined number of retries have been exceeded. If the predetermined number of retries are exceeded, the error mitigation system 215 begins the retry persistent error retry process 610. If the predetermined number of retries are not exceeded, the retry module 409 communicates 612 a retry command to the hardware controller 411. The log module 437 stores log information describing these events.

The hardware controller 411 receives the retry command. The hardware controller 411 executes 616 a retry of the code block 224. The dynamic signature analysis circuit 226 creates 620 a dynamic signature for the execution of the code block 224. The dynamic signature analysis circuit 226 transfers 622 the dynamic signature to the monitor module 403. The monitor module 403 receives the dynamic signature from the dynamic signature circuit via coupling 217 and transfers 627 the dynamic signature to the comparison module 407. The comparison module 403 receives the dynamic signature from the monitor module 403 and compares 632 the dynamic signature to the static signature to determine if the signatures match 636. If the signatures match, then the error mitigation system 215 goes 535 to the next code block 224 to check for errors. If the signatures do not match 636, then the error mitigation system 215 restarts the transient error retry process at step 603. The retry the transient error retry process continues until either the signatures match 636, or the retry module 409 determines that the predetermined number of retry attempts have been reached 607. If the signatures match 636, then the error mitigation system 215 goes to the next code block 640 to check for errors. The log module 437 stores log information describing the above events.

Figure 7A:
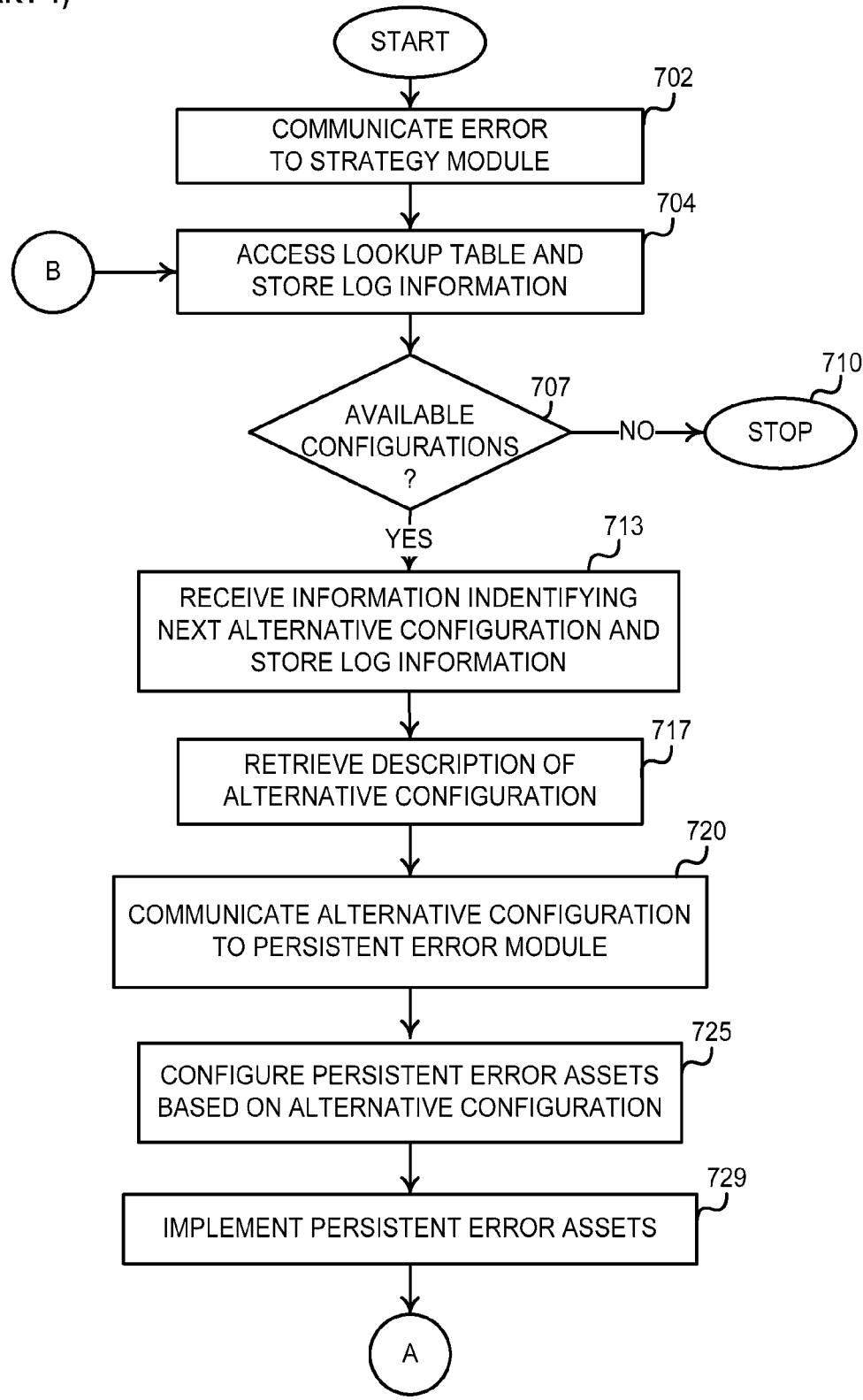
FIGS. 7A and 7B are flow charts for a method for mitigating persistent errors detected in digital logic in accordance with the present invention.
Figure 7B:
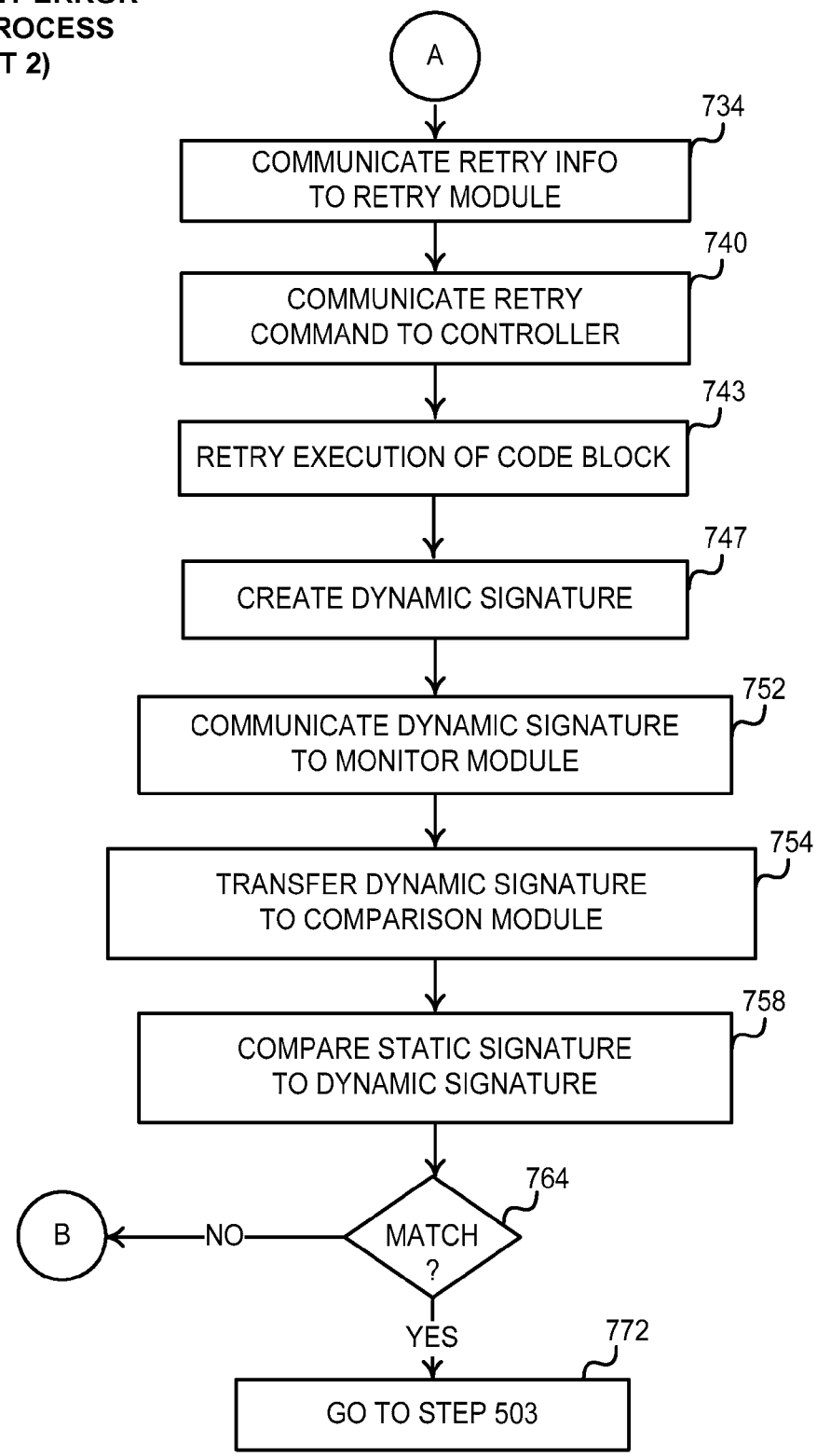

Referring now to FIGS. 7A and 7B, a flowchart of a general method for one embodiment of the persistent error retry process is described. The retry module 409 communicates 702 the persistent error to the strategy module 417. The strategy module 417 receives the error information from the retry module 409. The strategy module 417 accesses 704 the lookup table 413. The strategy module 417 determines 707 whether there are available alternative configurations 415 for the particular code block 224. If there are no available alternative configurations, the persistent error retry process stops 710 and the error mitigation system 215 moves on to the next code block 224 to check for errors. If there are available alternative configurations, then the strategy module 417 receives 713 information identifying the next available alternative configuration 415. The next available alternative configuration is the highest ranking alternative configuration 415 that has yet to be implemented by the error mitigation system 215. The strategy module 417 then communicates with the set of alternative configurations 415 to retrieve 717 information describing the next available alternative configuration. The strategy module 417 then communicates 720 this information to the persistent error module 421. The persistent error module 421 receives information describing the next alternative configuration 415 from the strategy module 417. The persistent error module 421 then configures 725 the persistent error assets 422A to implement 729 the next available alternative configuration 415. The log module 437 stores log information describing the above events.

Turning now to FIG. 7B, the persistent error module 421 communicates 734 with the retry module 409 to indicate that it is time to retry the code block 224. The retry module 409 communicates 740 a retry command to the hardware controller 411. The hardware controller 411 receives a command from the retry module 409 to re-execute the code block 224. The hardware controller 411 retries 743 execution of that code block 224. The dynamic signature analysis circuit 226 creates 747 a dynamic signature. This signature is communicated 752 to the monitor module 403. The monitor module 403 transfers 754 the dynamic signature to the comparison module 407. The comparison module 407 compares 758 the dynamic signature to the static signature. If the dynamic signature matches 764 the static signature, then the error mitigation routine goes 772 to step 503, where the process begins for the next code block 224. If the signatures do not match 764, then the retry module 409 goes to step 704 where the strategy module 417 begins the process of implementing the next available alternative configuration 415. The error mitigation system 215 will continue this process until either all of the alternative configurations 415 for the code block 224 are tried, or an alternative configuration 415 is found that allows the processor 110 to operate with the persistent error, i.e., until the code block 224 executes error-free.

Figure 8A:
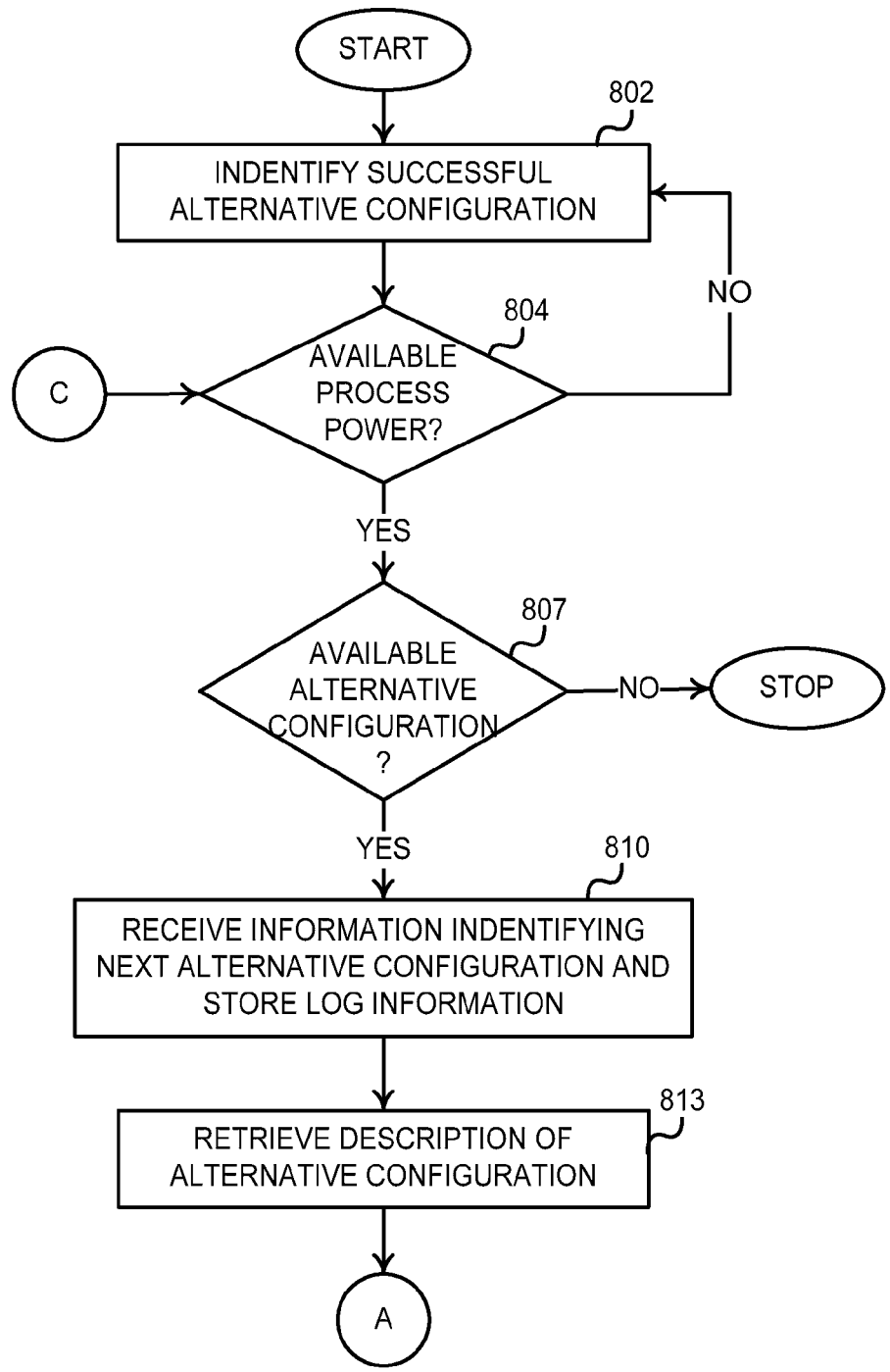
FIGS. 8A-8C are flow charts for a method for optimizing an alternative configuration for digital logic in accordance with the present invention.
Figure 8B:
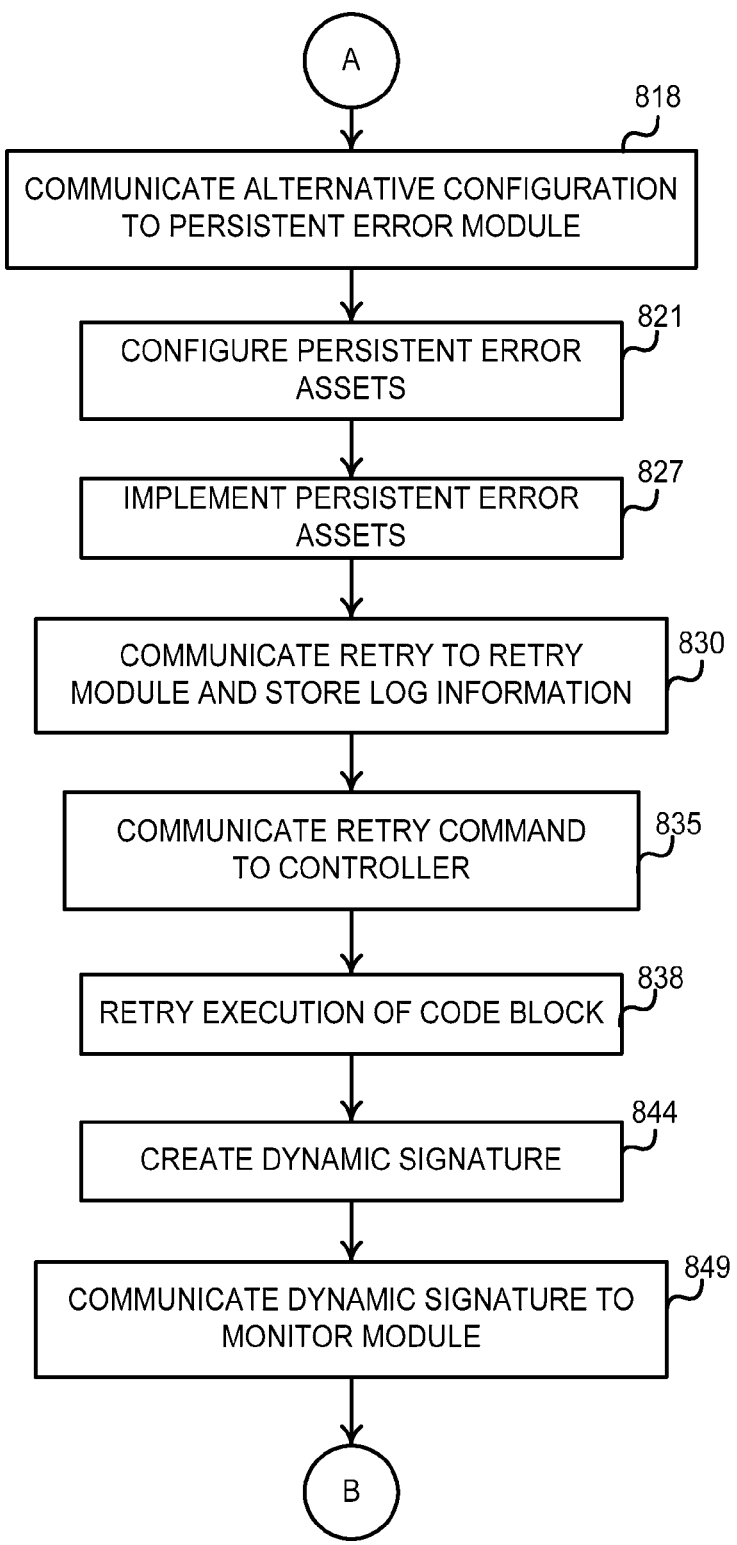
Figure 8C:
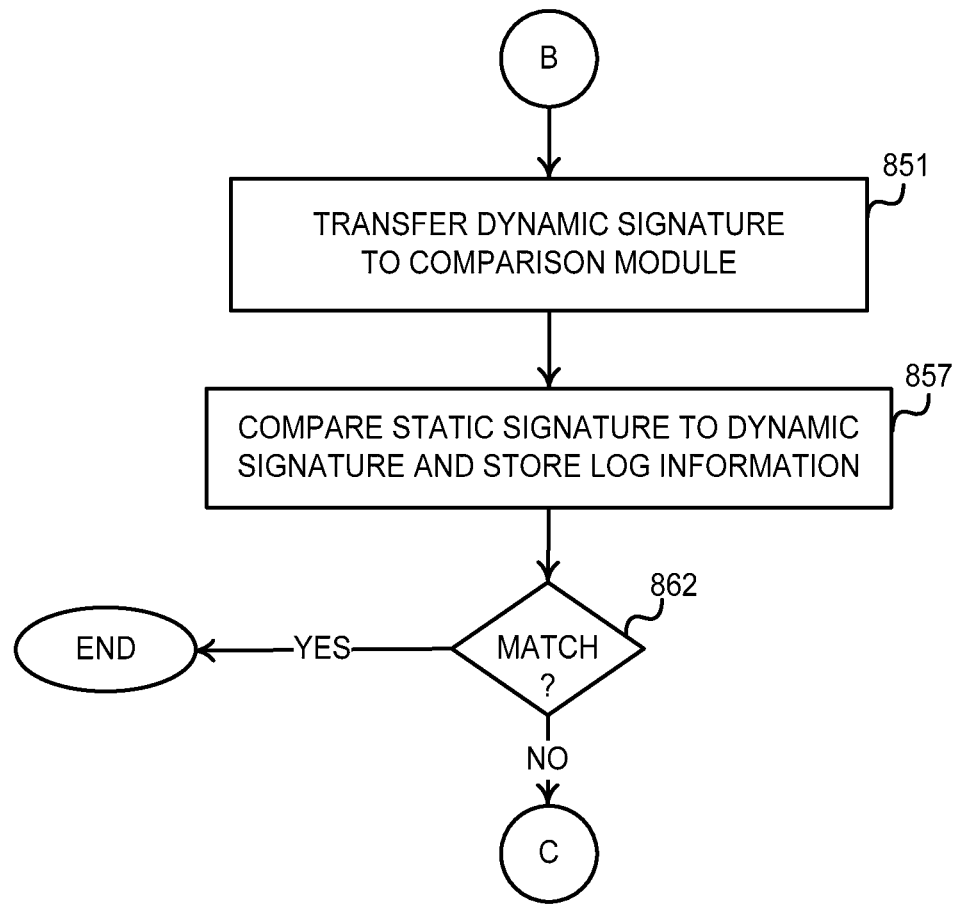

Referring now to FIG. 8A-8C, a flowchart of a general method for one embodiment of the optimization process is described. The optimization process begins 802 once a successful alternative configuration 415 is identified. The optimization module 430 checks 804 the processor 110 to see if processor power is available. The optimization module 430 does not proceed to step 807 until adequate processor power is available. Once adequate processor power is available, the optimization module communicates with the strategy module 417 to determine 807 if the lookup table 413 includes an alternative configuration 415 that has not been tried. If all of the alternative configurations 415 have been tried, then the optimization process stops. If there are available untried alternative configurations, then the optimization module 430 uses surplus processor power to emulate each of these available alternative configurations 415 to check for an alternative configuration that achieves better performance. Steps 810 through 862 for the optimization process are the same as described above for the persistent error retry process in steps 713 through 772.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. In one embodiment, the various modules shown in FIGS. 4A-4H comprise computer-executable code stored on the processor's 110 on-chip storage. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A self-healing system, the system comprising:
a processor comprising a code block, a dynamic signature analysis circuit and an error mitigation system,
the code block associated with the operation of a portion of digital logic and the dynamic signature analysis circuit, the processor coupled to execute the code block, the dynamic signature analysis circuit coupled to create a dynamic signature representing the operation of the portion of digital logic associated with the code block;
the error mitigation system coupled for receiving the dynamic signature from the dynamic signature analysis circuit, the error mitigation system having a static signature representing error-free execution of the code block, the error mitigation system comparing the dynamic signature to the static signature to detect an error in the digital logic based on whether the signatures match, the error mitigation system coupled to retry execution of the code block if the signatures do not match, the error mitigation system storing log information that includes (1) a description of the error, (2) the retrying execution of the code block, and (3) a result of the retrying execution, the log information further including one or more of a description of system temperature history that was recorded by the error mitigation system prior to the detection of the error in the digital logic, and a description about an amount of processor power used during retry attempts for the detected error.

2. The self-healing system of claim 1 further comprising:
a network interface coupled to upload the log information to an external system.

3. The self-healing system of claim 1 further comprising:
a network interface coupled to receive update information from an external system, the update information including information for reconfiguring the code block and/or the digital logic.

4. The self-healing system of claim 1 further comprising:
an interface coupled to receive update information from a storage device, the update information including information for reconfiguring the code block and/or the digital logic.

5. The self-healing system of claim 1, wherein the log information comprises a description of a detected error, the code block for which an error was detected, a time when the error was detected, a location when the error was detected and a number of retry attempts for the detected error.

6. The self-healing system of claim 1, wherein:
the error mitigation system is coupled to receive a dynamic signature from the dynamic signature circuit for the retried execution of the code block, the error mitigation system comparing the dynamic signature for the retried execution to the static signature to determine if the signatures match, the error mitigation system continuing to retry execution of the code block until either the signatures match or a predetermined number of retries are executed.

7. The self-healing system of claim 6, wherein:
the error mitigation system includes a set of alternative configurations for the digital logic associated with the code block, the error mitigation system coupled to implement one of the alternative configurations from the set of alternative configurations, the error mitigation system retrying execution of the code block, receiving a dynamic signature for this retry execution from the dynamic signature analysis circuit, and comparing this dynamic signature to the static signature to determine if the signatures match.

8. The self-healing system of claim 7, wherein:
the error mitigation system includes a lookup table, the lookup table having a list that ranks the order in which the alternative configurations from the set of alternative configures should implemented, the error mitigation system accessing the lookup table to determine which one of the alternative configurations from the set of alternative configurations to implement.

9. The self-healing system of claim 7, wherein the alternative configurations are implemented using emulation software, a field-programmable logic array and/or a soft-core processor.

10. The self-healing system of claim 7, wherein the error mitigation system continues to implement the alternative configurations and retry execution of the code block until either the signatures match or all of the alternative configurations for the code block have been implemented.

11. The self-healing system of claim 7, wherein the log information comprises a description of the detected error, the code block for which the error was detected, a time when the error was detected, a location when the error was detected, a number of retry attempts for the detected error, the alternative configurations implemented and results for the alternative configurations.

12. A method for detecting and mitigating an error in digital logic, the method comprising:
   executing a code block, the code block associated with operation of a portion of the digital logic;
   creating a dynamic signature representing operation of the portion of digital logic;
   comparing the dynamic signature to a static signature to detect an error in the digital logic based on whether the signatures match, the static signature representing an error-free execution of the code block;
   retrying execution of the code block responsive to detecting an error; and
   storing log information that includes (1) a description of the error, (2) the retrying execution of the code block, and (3) a result of the retrying execution, the log information further including one or more of a description of system temperature history that was recorded by the error mitigation system prior to the detection of the error in the digital logic, and a description about an amount of processor power used during retry attempts for the detected error.

13. The method of claim 12 further comprising:
   uploading the log information to a central server.

14. The method of claim 12 further comprising:
   receiving update information from a central server, the update information including information for reconfiguring the code block and/or the digital logic.

15. The method of claim 12 further comprising:
   receiving update information from a storage device, the update information including information for reconfiguring the code block and/or the digital logic.

16. The method of claim 12, wherein the log information comprises a description of the detected error, the code block for which the error was detected, a time when the error was detected, a location when the error was detected and a number of retry attempts for the detected error.

17. A method for detecting and mitigating an error in digital logic, the method comprising:
   executing a code block, the code block associated with operation of a portion of the digital logic;
   creating a dynamic signature representing operation of the portion of digital logic;
   comparing the dynamic signature to a static signature to detect an error in the digital logic based on whether the signatures match, the static signature representing an error-free execution of the code block;
   retrying execution of the code block;
   receiving a dynamic signature for the retried execution of the code block;
   comparing the dynamic signature for the retried execution to the static signature to determine if the signatures match;
   continuing to retry execution of the code block until either the signatures match or
   a predetermined number of retries are executed; and
   storing log information that includes (1) a description of the error, (2) the retrying execution of the code block, and (3) a result of the retrying execution, the log information further including one or more of a description of system temperature history that was recorded by the error mitigation system prior to the detection of the error in the digital logic, and a description about an amount of processor power used during retry attempts for the detected error.

18. The method of claim 17 further comprising:
   implementing an alternative configuration from a set of alternative configurations;
   retrying execution of the code block to determine whether the implemented alternative configuration results in error-free operation of the code block;
   receiving a dynamic signature for this retry execution from the dynamic signature analysis circuit; and
   comparing this dynamic signature to the static signature to determine if the signatures match.

19. The method of claim 18 further comprising:
   accessing a lookup table to determine which one of the alternative configurations from the set of alternative configurations to implement, the lookup table having a list that ranks the order in which the alternative configurations from the set of alternative configures are implemented.

20. The method of claim 18, wherein the alternative configurations are implemented using emulation software, field-programmable logic arrays and/or soft-core processors.

21. The method of claim 18, wherein the log information comprises a description of the detected error, the code blocks for which the error was detected, a time when the error was detected, a location when the error was detected, a number of retry attempts for the detected errors, the alternative configurations implemented and results for the alternative configurations.

* * * * *